(12) United States Patent
Johnson

(10) Patent No.: US 8,275,682 B2
(45) Date of Patent: Sep. 25, 2012

(54) SYSTEMS AND METHODS FOR CONSUMER PRICE INDEX DETERMINATION USING PANEL-BASED AND POINT-OF-SALE MARKET RESEARCH DATA

(75) Inventor: Keith Johnson, New York, NY (US)

(73) Assignee: The Nielsen Company (US), LLC., Schaumburg, IL (US)

( * ) Notice: Subject to any disclaimer, the term of this patent is extended or adjusted under 35 U.S.C. 154(b) by 786 days.

(21) Appl. No.: 12/341,854

(22) Filed: Dec. 22, 2008

(65) Prior Publication Data
US 2009/0222324 A1    Sep. 3, 2009

Related U.S. Application Data

(60) Provisional application No. 61/032,739, filed on Feb. 29, 2008.

(51) Int. Cl.
*G06Q 40/00* (2012.01)
(52) U.S. Cl. .......................................... 705/35; 705/26.7
(58) Field of Classification Search .................... 705/35, 705/10
See application file for complete search history.

(56) References Cited

U.S. PATENT DOCUMENTS

| | | | |
|---|---|---|---|
| 4,331,973 A | 5/1982 | Eskin et al. | |
| 4,546,382 A | 10/1985 | McKenna et al. | |
| 4,816,904 A | 3/1989 | McKenna et al. | |
| 5,414,838 A | 5/1995 | Kolton et al. | |
| 5,854,746 A | 12/1998 | Yamamoto et al. | |
| 6,965,875 B1 | 11/2005 | Levine | |
| 7,076,454 B2 | 7/2006 | Kim | |
| 7,321,865 B2 | 1/2008 | Kelly et al. | |
| 7,478,035 B1 * | 1/2009 | Wrench et al. | 704/7 |
| 8,005,740 B2 * | 8/2011 | Arnott et al. | 705/36 R |
| 2003/0009407 A1 | 1/2003 | Twardowski | |
| 2005/0086121 A1 | 4/2005 | Brown | |
| 2007/0016918 A1 | 1/2007 | Alcorn et al. | |
| 2007/0100715 A1 * | 5/2007 | O'Donnell et al. | 705/35 |
| 2007/0156515 A1 | 7/2007 | Hasselback et al. | |
| 2007/0294132 A1 | 12/2007 | Zhang et al. | |
| 2007/0294705 A1 | 12/2007 | Gopalakrishnan et al. | |
| 2008/0033789 A1 | 2/2008 | Shindoh et al. | |

OTHER PUBLICATIONS

"United States Consumer Price Index," retrieved from Wikipedia, on Jun. 3, 2009 (7 pages).
Liegey, Paul R., "Hedonic Quality Adjustment Methods for Clothes Dryers in the U.S. CPI," United States Department of Labor, Bureau of Labor Statistics, Apr. 22, 2003 (33 pages).

(Continued)

*Primary Examiner* — Jagdish Patel
*Assistant Examiner* — Kevin Poe
(74) *Attorney, Agent, or Firm* — Hanley, Flight & Zimmerman, LLC

(57) ABSTRACT

Systems and methods for consumer price index determination using panel-based and point-of-sale market research data are disclosed. An example method to determine a consumer price index disclosed herein comprises obtaining panelist market research data determined by monitoring items purchased by a plurality of statistically-selected panelists, obtaining retail site market research data for items sold by a plurality of retail sites, combining the panelist market research data and the retail site market research data to determine weighted equivalent unit pricing information for each group of common items in an item stratum of the consumer price index having substantially similar attributes except for a unit amount, and determining the consumer price index using the weighted equivalent unit pricing information.

29 Claims, 17 Drawing Sheets

OTHER PUBLICATIONS

"Consumer Expenditure Survey," retrieved from Wikipedia on Jun. 3, 2009 (2 pages).

Broda et al., "Product Creation and Destruction: Evidence and Price Implications," Apr. 2007 (65 pages).

"Chapter 17. The Consumer Price Index," issued by the United States Department of Labor, Bureau of Labor Statistics, Jun. 2007 (108 pages).

* cited by examiner

450

Relative Importance of CPI Components

| | | | |
|---|---|---|---|
| Food and Beverage | 15.0% | | |
| Food | | 13.9% | |
|   At Home | | | 7.9% |
|   Away from Home | | | 6.0% |
| Beverages | | 1.1% | |
|   At Home | | | 0.7% |
|   Away from Home | | | 0.4% |
| Housing | 42.7% | | |
| Shelter | | 32.8% | |
| Utilities | | 5.3% | |
| Household Furnishings | | 4.7% | |
|   Housekeeping Supplies | | | 0.9% |
|   Hardware | | | 0.8% |
|   Household Equiment | | | 0.6% |
|   Other (Durable) | | | 2.5% |
| Apprel | 3.7% | | |
| Transportation | 17.2% | | |
| Private | | 16.2% | |
|   Vehicles | | | 7.6% |
|   Motor Fuel | | | 4.3% |
|   Parts and accessories | | | 0.4% |
|   Motor Vehicle Fees | | | 0.5% |
|   Insurance | | | 2.3% |
|   Other | | | 1.1% |
| Public | | 1.1% | |
| Medical Care | 6.3% | | |
| Medical Care Commodities | | 1.4% | |
|   Perscription Drugs | | | 1.0% |
|   OTC | | | 0.4% |
| Medical Care Services | | 4.8% | |
|   Professional | | | 2.8% |
|   Hospital | | | 1.5% |
|   Insurance | | | 0.5% |
| Recreation | 5.6% | | |
| Video and Audio | | 1.7% | |
|   Equipment | | | 1.2% |
|   Content | | | 0.3% |
|   Service | | | 1.1% |
| Pets and Products | | 0.6% | |
| Sporting Goods | | 0.7% | |
| Reading | | 0.3% | |
| Other | | 2.2% | |
| Education & Communication | 6.0% | | |
| Education | | 3.1% | |
|   Books and supplies | | | 0.2% |
|   Other | | | 2.9% |
| Communication | | 3.0% | |
|   Postage and Delivery | | | 0.2% |
|   Telephons Services | | | 2.2% |
|   Information Technology | | | 5.4% |
| Other Goods and Services | 3.5% | | |
| Tobacco | | 0.7% | |
| Personal Care | | 2.8% | |
|   Products | | | 0.7% |
|   Services | | | 2.1% |
| Coverage | 100% | | |

FIG. 4B

Sub-group Module #8422 ← 620

| | |
|---|---|
| Sub-Group | DIARRHEA REMEDIES |

DEFINITION

INCLUDE ALL PRODUCTS TAKEN FOR THE RELIEF OF DIARRHEA. INCLUDE ALL SIZES AND FORMS (TABLETS, LIQUIDS, ETC.). RELATED AUDIT PC-C8700.
EXCLUDE:
A) PRESCRIPTION ITEMS
B) PEPTO - BISMOL (8412)
C) PAREGORIC
D) PAREGORIC COMPOUNDS

ATTRIBUTES

1. BRAND
2. TYPE - REGULAR VS CONCENTRATE
3. FLAVOR - PEPPERMINT, REGULAR, ETC.
4. STYLE - LOPERAMIDE VS REGULAR
5. FORM - LIQUID, TABLETS, ETC.
6. SIZE - OUNCES VS COUNTS

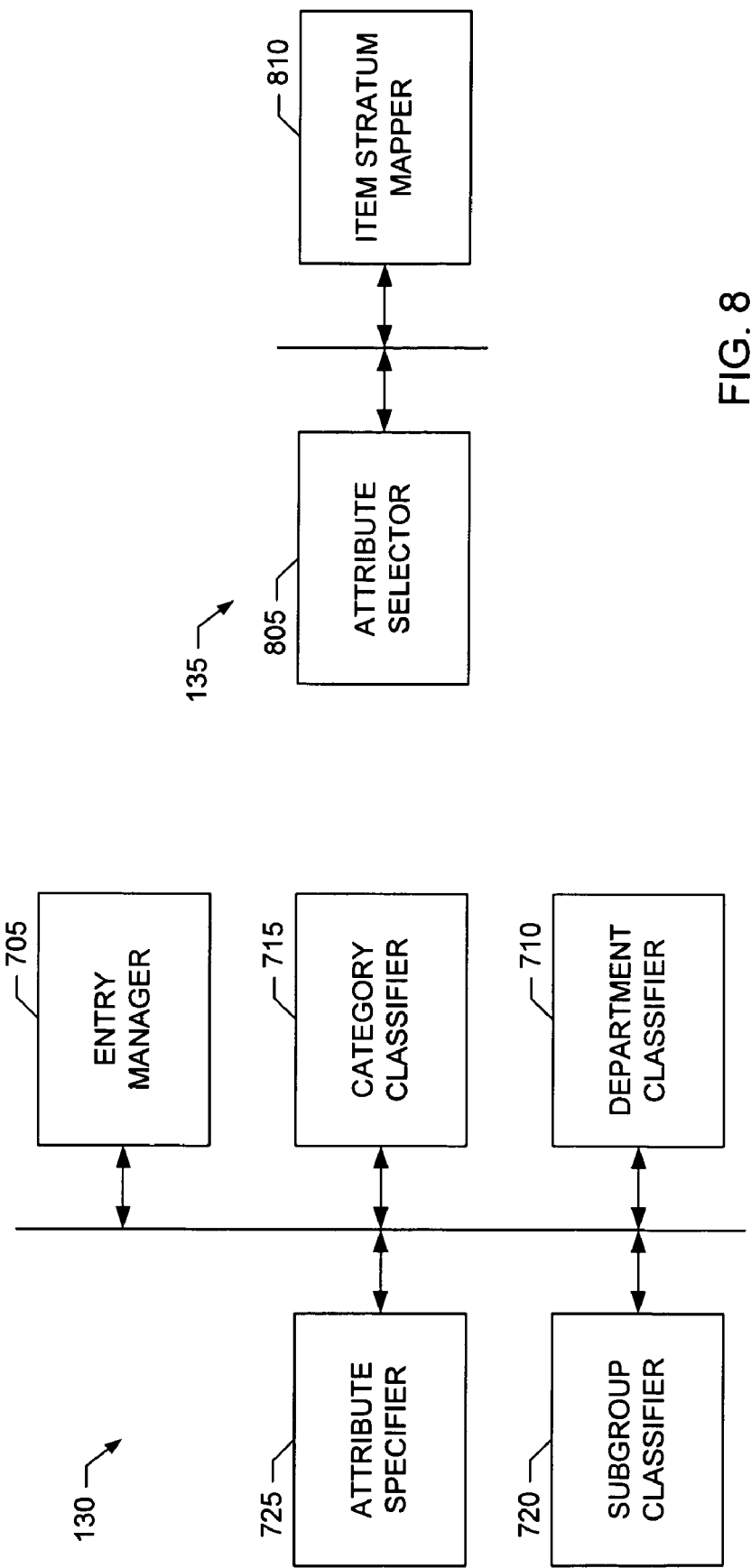

SYSTEMS AND METHODS FOR CONSUMER PRICE INDEX DETERMINATION USING PANEL-BASED AND POINT-OF-SALE MARKET RESEARCH DATA

RELATED APPLICATION

This patent claims priority from U.S. Provisional Application Ser. No. 61/032,739, entitled "Systems and Methods for Consumer Price Index Determination Using Panel-Based Market Research Data" and filed on Feb. 29, 2008. U.S. Provisional Application Ser. No. 61/032,739 is hereby incorporated by reference in its entirety.

FIELD OF THE DISCLOSURE

This disclosure relates generally to economic forecasting and, more particularly, to systems and methods for consumer price index determination using panel-based and point-of-sale market research data.

BACKGROUND

A Consumer Price Index (CPI) is a statistical measure of an average price change of consumer goods over a specified period of time. In the United States, the Department of Labor's Bureau of Labor and Statistics (BLS) publishes CPI data for the U.S. in the form of the following three main CPI series: the CPI for All Urban Consumers (CPI-U), the Chained CPI for All Urban Consumers (C-CPI-U), and the CPI for Urban Wage Earners and Clerical Workers (CPI-W). The consumer prices used to determine all three CPI series are the same. However, different weights and/or formulas are used to combine the consumer prices to determine the different CPI series.

The BLS determines each CPI using a two stage calculation. The first stage involves dividing the universe of all goods and services to be included in the CPI into 211 categories, or "item strata," across 38 geographic areas, or "index areas." By combining the price changes of the items included in each item stratum, the average price differential for each of the 211 item strata across each of the 38 geographic areas is then calculated, resulting in 211×38=8018 "basic indexes." The second stage of CPI calculation involves weighting and combining the basic indexes to determine the particular CPI series. The weights and/or formula used to combine the basic indexes are determined according to the series and geographic area for the specific CPI to be calculated.

In the U.S., the CPI data published by the BLS can impact the economy, as well as individual income. For example, federal spending and revenues in certain areas are directly affected by the BLS CPI. Cost of living increases included in many individual employment contracts are also tied to the BLS CPI. Thus, any error or bias of the BLS CPI can be detrimental on many different levels.

BRIEF DESCRIPTION OF THE DRAWINGS

FIG. 4B illustrates a set of example relative expenditures determined by the example data consolidator of FIG. 4A for a respective set of consumer items.

FIGS. 6A-6B collectively illustrate an example product reference dictionary arrangement that may be used to implement the example system of FIG. 1.

FIG. 7 is a block diagram of an example product reference dictionary processor that may be used to implement the example system of FIG. 1.

FIG. 8 is a block diagram of an example item strata specifier that may be used to implement the example system of FIG. 1.

DETAILED DESCRIPTION

Figure 1:
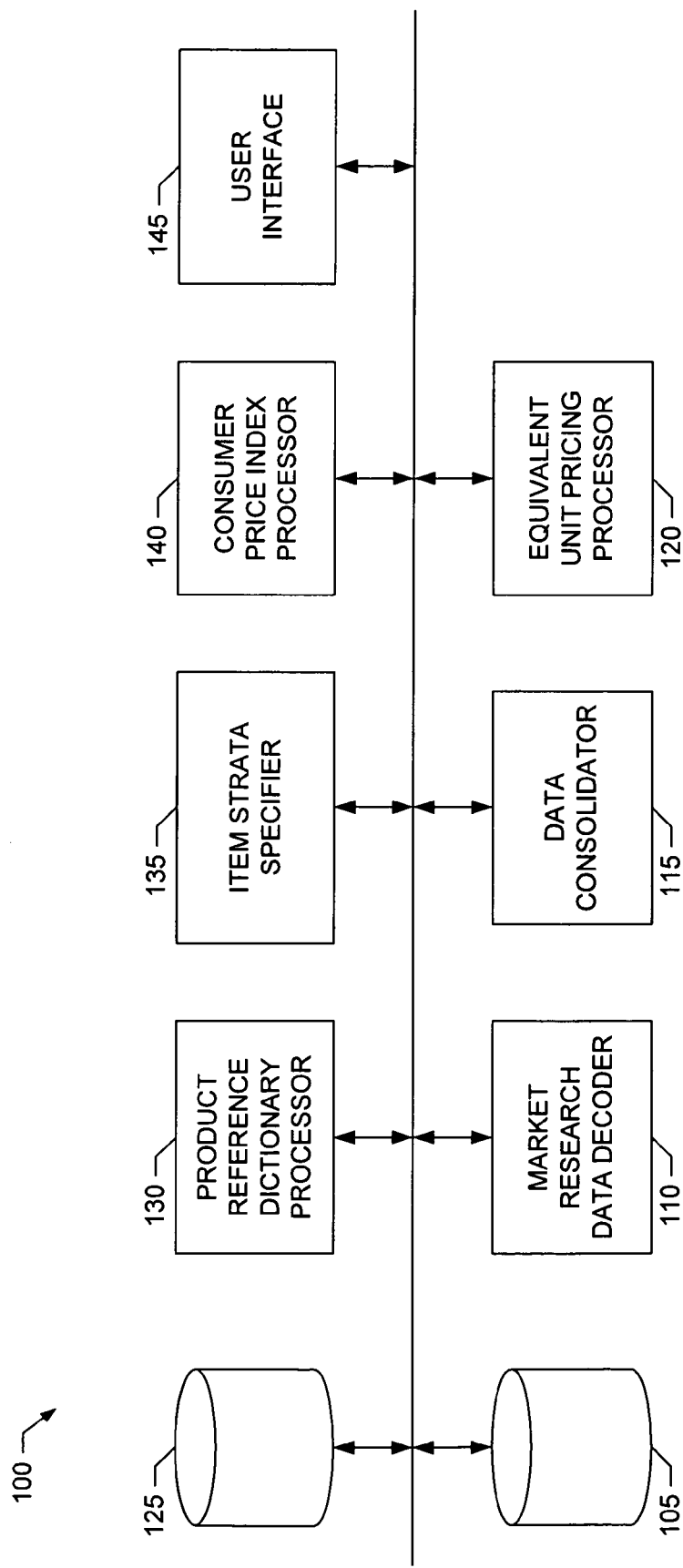
FIG. 1 is a block diagram of an example system for determining a consumer price index.

An example system 100 to determine consumer price indexes (CPIs) according to the methods and/or apparatus described herein is illustrated in FIG. 1. The example system 100 overcomes many deficiencies associated with the CPI determined by the U.S. Department of Labor's Bureau of Labor and Statistics (BLS). For example, the BLS CPI suffers from sampling errors arising from a limited number of price survey data points used to calculate each of the CPI's basic indexes. On average, only seven (7) price quotations are used by the BLS to calculate an average price differential (e.g., price change) for many of the 211 item strata in each of the 38 geographic areas, with an average of 280 price quotes overall for the 38 geographic areas as a whole. This limited number of price quotations, or price survey data points, can result in significant sampling error over time, causing a larger than desired variance (or standard error), root-mean-squared (rms) error, etc., in the CPI calculated by the BLS.

Additionally, the BLS CPI exhibits a number of biases that degrade its accuracy and systematically cause the BLS CPI to, for example, overestimate inflation. Some of the biases exhibited by the BLS CPI include a new product bias, a quality bias, a discounting bias and a substitution bias. The new product bias occurs because the BLS CPI is based on measuring price changes of common goods over time. However, when a product is new, there is no price history for the product. Therefore, a number of years may pass before a new product is included in the BLS CPI, even though the new product may be highly popular and/or may have higher quality than comparable common products already included in the BLS CPI. The quality bias arises because the BLS CPI determines the average price change for each item stratum under an assumption that the quantity of items purchased remains constant over the time interval being measured. However, while product quality improvements, the introduction of new products having higher quality, and/or the removal of products from the marketplace having poorer quality may cause the average price for a given item stratum to increase, the overall household expenditure for the item may actually decrease because higher quality means fewer such items need to be purchased over time.

The discounting bias occurs because the BLS CPI does not differentiate between regular pricing of products in each item stratum and promoted pricing of these same products by retails outlets, discount merchandisers, etc. Promoted (e.g., discounted) pricing and the resulting market competition can cause product price to vary dramatically during any given measurement interval. Finally, the substitution bias is present in the BLS CPI because its classification of products into item strata is fairly inflexible. However, consumers may mix product expenditure between, for example, national brands, retailer (e.g., private label) brands, generics, etc., some of which may or may not be classified into a CPI item stratum. The effects of such product substitution are not readily taken into account by the BLS CPI's inflexible item classification scheme.

The BLS has taken steps to address the accuracy issues associated with its CPI calculations and the foregoing biases. For example, the BLS now performs more frequent forced retail outlet and item rotations in an attempt to include new products in the CPI more quickly. The BLS also adopted hedonic regression to help address estimating the value of items that change in quality. Geometric means are now used by the BLS to calculate many of its basic indexes in an attempt to reduce substitution bias. Furthermore, the BLS introduced its chained CPI (C-CPI-U), which includes both past and current expenditures, thereby allowing the change in purchase quantities over time to be factored into the determined chained CPI. However, the above-mentioned errors and biases associated with the BLS CPI, although possibly reduced by the additional steps taken by the BLS, still exist.

Furthermore, the chained CPI (C-CPI-U) published by the BLS is not readily available after a given measurement period. In particular, the "current expenditure" information used to calculate the chained CPI is not readily available at the end of the measurement interval when the chained CPI is first published. Instead, the BLS publishes "interim" estimates of the chained CPI on a monthly basis. Then, one year later, these interim values are replaced by a final chained CPI calculated using the then available "current expenditure" information corresponding to the measurement period ending one year ago. Therefore, significant measurement delay is associated with the BLS chained CPI. This delay itself can also be a source of error for applications using the BLS chained CPI.

The example system 100 of FIG. 1 determines CPIs using methods and/or apparatus that mitigate most, if not all, of the above-mentioned errors and biases associated with the BLS CPI, even taking into consideration the additional steps taken by the BLS to reduce such errors and biases. For example, the system 100 has access to large databases of market research data, thereby allowing any sampling error to be made negligible. The system 100 also employs a product reference dictionary and real time item characteristic coding to represent purchased items, thereby allowing new products to be incorporated and product substitution to be reflected in its determined CPIs. Additionally, the system 100 is able to track regular and promoted (e.g., discounted) product pricing and to indicate the different pricing in its determined CPIs as desired. Furthermore, the system 100 implements equivalent unit pricing in its CPI calculations to address quality changes and associated relative expenditure changes over time. Moreover, the system 100 does not exhibit the measurement delay associated with, for example, the BLS chained CPI. Therefore, in many circumstances, users of the system 100 can make better decisions with the more accurate and timely CPI data generated by the system than they could using the CPI data by the BLS.

Turning to FIG. 1, the example system 100 includes a market research database 105 to store market research data to be used by the example system 100 for CPI determination. The example market research database 105 is configured to store market research data obtained from a variety of different sources. The example market research database 105 may be implemented using any type of database technology, storage technology, memory technology, etc. In an example implementation, the market research database 105 is configured to store any or all of consumer panelist market research data, retail site market research data, market research data obtained from third-party market research data vendors, etc. In such an example implementation, the example market research database 105 is arranged to store the various types of market research data such that demographic information can be extracted from the stored data. For example, consumer panelist market research data may be arranged to allow consumer purchasing information to be separated into different demographic categories, such as, for example, household income, age, race/ethnicity, location, etc.

In an example implementation, the consumer panelist market research data is obtained by monitoring items purchased by a plurality of statistically-selected panelists. The obtained panelist market research data stored in the example market research database 105 is then used by the example system 100 to determine, for example, a number of units sold and/or a relative expenditure for each type of item purchased by the plurality of statistically-selected panelists and to be included in CPI determination. In other words, the example system 100 uses the stored panelist market research data to determine the portion of the panel's total purchasing budget used to purchase the particular item. Through any appropriate statistical manipulation, these determined relative expenditures may then be used to represent each item's relative expenditure for some segment of the overall population. Furthermore, the relative expenditure for each item may be determined for a particular demographic using the demographic information included in the panelist market research data.

In the same or another example implementation, the retail site market research data is obtained from a plurality of retail sites and includes data describing the products sold by the retail sites (e.g., such as point-of-sale data for the retail sites). The obtained retail site market research data stored in the example market research database 105 is then used by the example system 100 to determine, for example, pricing information for items sold by the retail sites and to be included in the CPI determination. Through any appropriate statistical manipulation, this determined pricing information may then be used to represent each item's price for some appropriate geographic area based on, for example, the locations of the retail sites. Additionally, market research data may be obtained from third parties to augment the panelist and/or retail site market research data.

Figure 2:
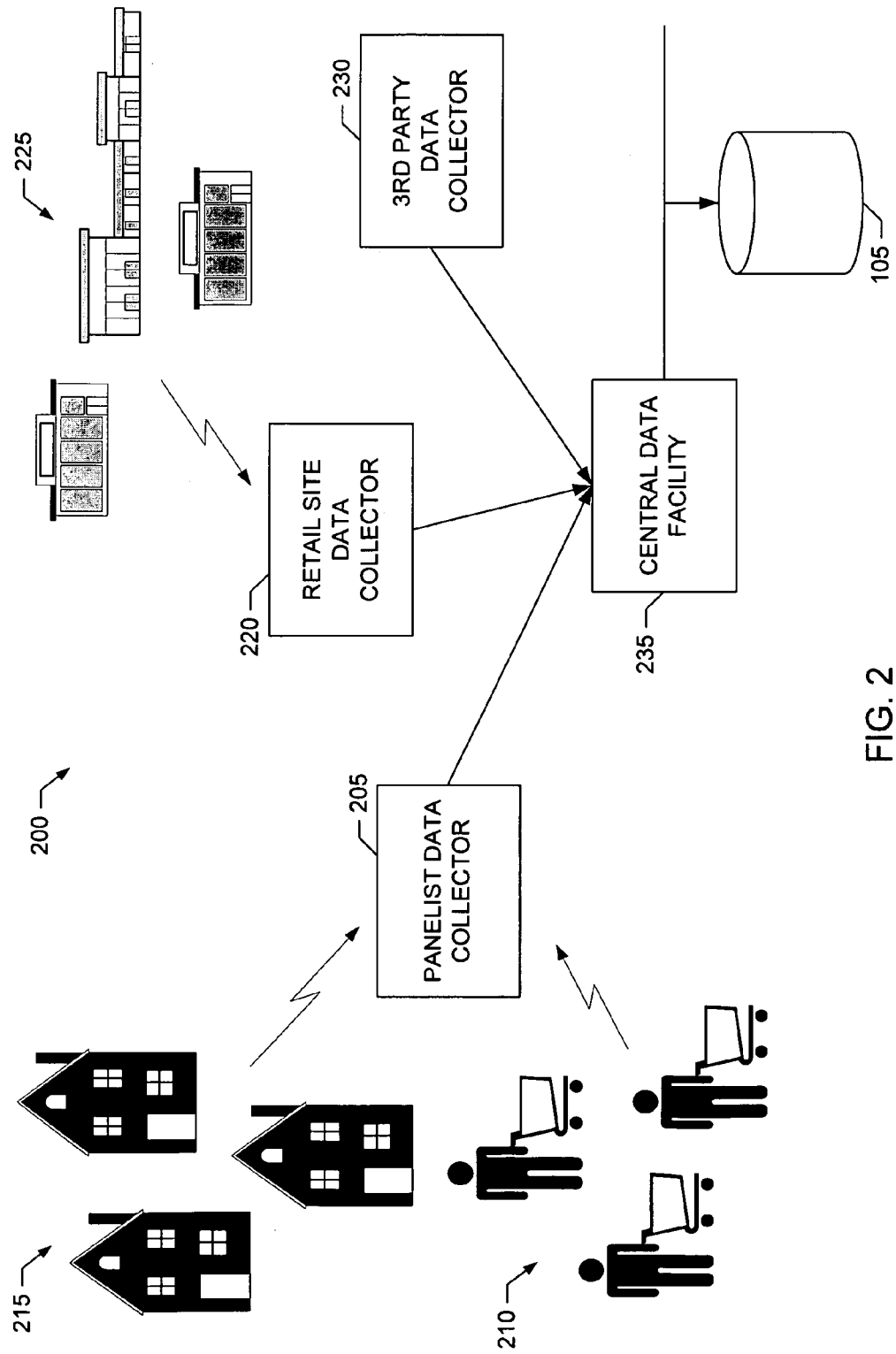
FIG. 2 is a block diagram of an example data collection system that may be used to collect market research data for use by the example system of FIG. 1.

An example data collection system 200 that may be used to collect market research data for storage in the example market research database 105 and subsequent use by the example system 100 is illustrated in FIG. 2. Turning to FIG. 2, the example data collection system 200 includes a panelist data collector 205 to collect panelist market research data from a plurality of statistically-selected panelists. In the illustrated example, the panelist data collector 205 is configured to collect market research data from statistically-selected individual panelists 210 as they shop and/or shortly after completing their purchasing activities. In the illustrated example, the panelist data collector 205 is also configured to collect market research data from statistically-selected households 215, for example, after completing purchasing activities and/or at some specified intervals of time. In an example implementation, the panelist market research data collected by the panelist data collector 205 includes any or all of panelist demographic data, purchase pricing information, purchased item brand identification information, purchased item type information (e.g., item name, product type, etc.), purchased item amount per unit information (e.g., quantity per unit, unit size, etc.), purchase location information (e.g., geographic area, retail site name and/or location, etc.), purchased unit quantity information (e.g., number of units purchased, etc.), etc., for items purchased by the statistically-selected individual panelists 210 and the statistically-selected households 215 during a time period of interest (e.g., such as an interval of time measured by a CPI determined by the example system 100).

The market research data corresponding to the statistically-selected individual panelists 210 and/or the statistically-selected households 215 may be determined/generated via one or more manual and/or automatic panelist monitoring techniques. For example, the statistically-selected individual panelists 210 and/or the statistically-selected households 215 may be asked to manually complete surveys to record information regarding their purchased items and to transmit the completed surveys to the panelist data collector 205. Additionally or alternatively, the statistically-selected individual panelists 210 and/or the statistically-selected households 215 may be equipped with bar code scanners (or the like) and associated communication equipment to allow purchased items to be scanned and the scanned information to be automatically sent to the panelist data collector 205. In an example implementation, the manual and/or automatic panelist monitoring techniques may rely on recording (e.g., manually, via bar code scanning, etc.) Universal Product Code (UPC) information for items purchased by the statistically-selected individual panelists 210 and/or the statistically-selected households 215. The recorded UPC information may then used as a key to access a product reference dictionary (discussed in greater detail below) to obtain information regarding the corresponding purchased items.

In an example implementation, Nielsen Homescan® technology is used to implement panelist market research data collection for the panelist data collector 205. Nielsen Homescan® technology is able to capture consumer purchase information from over 260,000 households globally and provides insights into buying behavior across every type of purchase channel: from warehouse clubs to convenience stores, from supermarkets to drug stores, from computer stores and mass merchandisers to mail order and the Internet. Furthermore, the Nielsen Homescan® panel (e.g., the statistically-selected individual panelists 210 and/or the statistically-selected households 215) is demographically balanced to represent the household population, which allows analysis of consumer purchase behavior and shopping patterns for any segment of the population.

In a Nielsen Homescan® implementation, each household 215 is outfitted with one or more in-home bar code scanners to allow information regarding purchases of consumer goods to be collected on a continuous basis. Such continuous data collection makes it possible to measure the ongoing changes and interactions of household purchasing behavior across many different product types. Additionally, because the panel is demographically representative, purchasing behavior can be statistically processed to represent all households and/or specific demographic groups.

Returning to FIG. 2, the example data collection system 200 also includes a retail site data collector 220 to collect retail site market research data (e.g., such as point-of-sale data) from a plurality of retail sites 225. The retail sites 225 may include any site at which items may be purchased, such as, for example, one or more grocery stores, drug stores, convenience stores, department stores, mass merchandising outlets, discount outlets, club stores, Internet e-stores, etc. In an example implementation, the retail site market research data includes any or all of regular pricing information, promotional (e.g., discount) pricing information, sold item brand identification information, sold item type information (e.g., item name, product type, etc.), sold item amount per unit information (e.g., quantity per unit, unit size, etc.), sale location information, sold unit quantity information (e.g., number of units, etc.), etc., for the products sold by the plurality of retail sites 225 during a time period of interest (e.g., such as an interval of time measured by a CPI determined by the example system 100). In an example implementation, the market research data collected from the plurality of retail sites 225 is based on UPC data scanned when items are purchased at a reporting retail site. In some example implementations, the retail site market research data may also include demographic information obtained by associating purchases with particular consumer groups through the use of customer preferred, or similar, store cards.

The data collection system 200 of the illustrated example also includes a third party data collector 230 to collect market research data from third party market research data providers, such as, for example, the NPD Group, J.D. Power and Associates, Wolters Kluwer, etc. The market research data collected by the third party data collector 230 may be used to augment the panelist market research data collected by the panelist data collector 205 and/or the retail site market research data collected by the retail site data collector 220.

The example data collection system 200 further includes a central data facility 235 that acts as a central repository for the market research data collected by the example panelist data collector 205, the example retail site data collector 220 and the example third party data collector 230 as shown. In an example implementation, the central data facility 235 pre-processes the collected market research data from the different sources to align the data with a particular time period of interest (e.g., such as an interval of time measured by a CPI determined by the example system 100). Additionally or alternatively, the central data facility 235 may pre-process the collected market research data to remove any consumer identification information to allow the privacy of the statistically-selected individual panelists 210 and/or the statistically-selected households 215 to be maintained. The central data facility 235 then sends the collected and pre-processed market research data to the example market research database 105 for storage and subsequent use by the example system 100 of FIG. 1.

Returning to FIG. 1, to process the market research data stored in the market research database 105, the example system 100 further includes a market research data decoder 110. In the illustrated example, the market research data decoder 110 retrieves and decodes the panelist and retail site market research data stored in the market research database 105. In an example implementation, the market research data decoder 110 decodes the panelist market research data to obtain purchased product information, panelist demographic information, purchase location information, purchase price information, etc. In the same or another example implementation, the market research data decoder 110 decodes the retail site market research data to obtain sold product information, retail site location information, sold price information, etc. An example implementation of the market research data decoder 110 is illustrated in FIG. 3.

Figure 3:
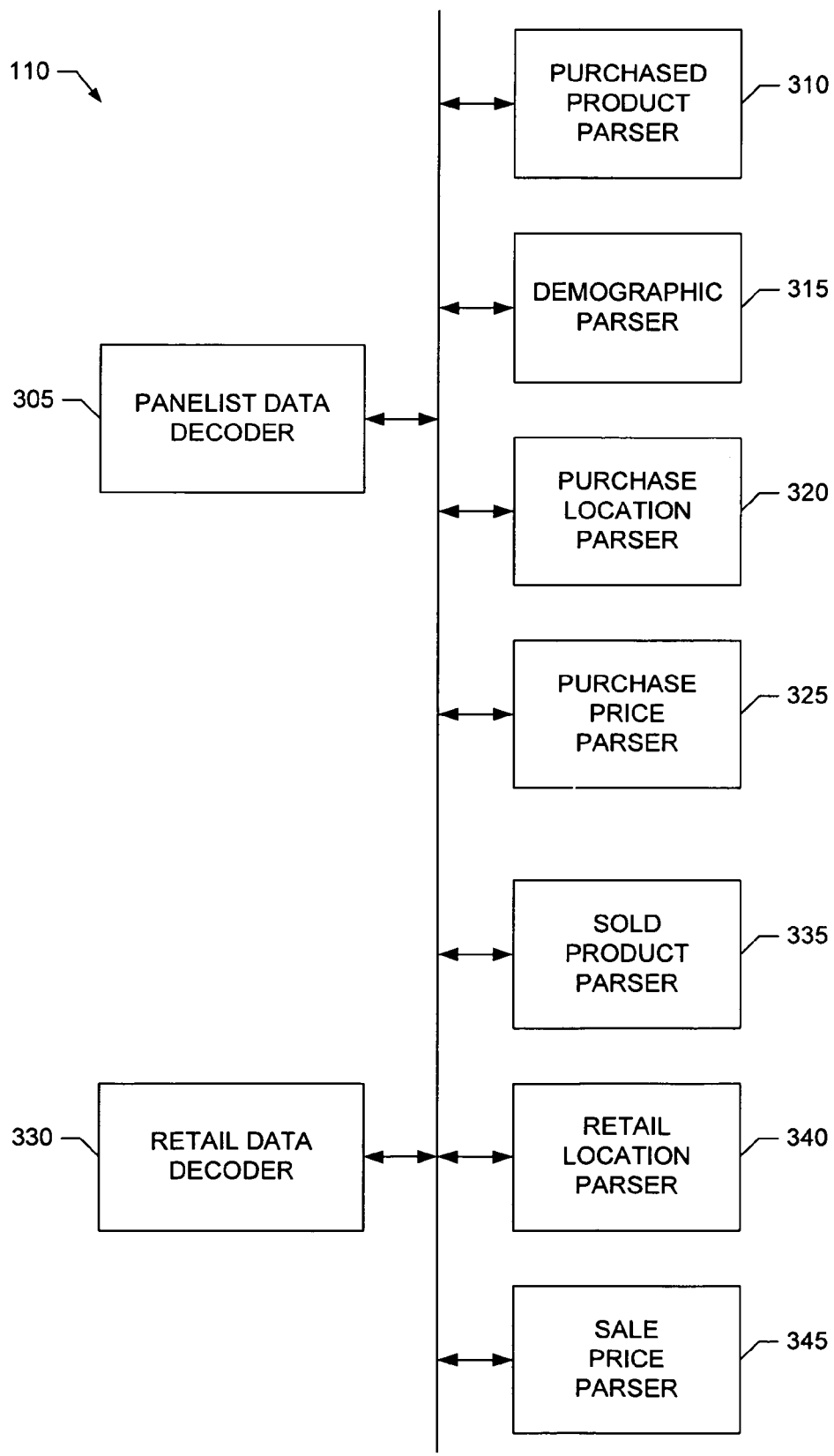
FIG. 3 is a block diagram of an example market research data decoder that may be used to implement the example system of FIG. 1.

Turning to FIG. 3, the market research data decoder 110 of the illustrated example includes a panelist data decoder 305 to retrieve and decode panelist market research data stored, for example, in the market research database 105. For example, the panelist data decoder 305 may be configured to retrieve the panelist market research data from the market research database 105, decrypt the panelist market research data and then decode the decrypted data into different data fields for subsequent processing in the market research data decoder 110. The market research data decoder 110 of FIG. 3 also includes a purchased product parser 310 to parse out purchased product information included in the panelist market research data decoded by the panelist data decoder 305. In an example implementation, the purchased product parser 310 parses any or all of purchased item brand identification information, purchased item type information (e.g., item name, product type, etc.), purchased item amount per unit information (e.g., quantity per unit, unit size, etc.) purchased unit quantity information (e.g., quantity of units, etc.), purchased time information (e.g., a timestamp), etc., for each item included in the panelist market research data decoded by the panelist data decoder 305.

Additionally, the example market research data decoder 110 of FIG. 3 includes a demographic parser 315 to parse out demographic information included in the panelist market research data decoded by the panelist data decoder 305. For example, the demographic information parsed by the demographic parser 315 may include any or all of household income, age, race/ethnicity, location, etc., associated with purchasers of each item included in the panelist market research data decoded by the panelist data decoder 305. The example market research data decoder 110 of FIG. 3 also includes a purchase location parser 320 to parse out purchase location information included in the panelist market research data decoded by the panelist data decoder 305. For example, the purchase location information may include geographic area, retail site name and/or location, etc., corresponding to where each item included in the panelist market research data decoded by the panelist data decoder 305 was purchased. Furthermore, the example market research data decoder 110 also includes a purchase price parser 325 to parse out purchase price information included in the panelist market research data decoded by the panelist data decoder 305.

To retrieve and decode retail site market research data stored, for example, in the market research database 105, the example market research data decoder 110 of FIG. 3 includes a retail site data decoder 330. For example, the retail site data decoder 330 may be configured to retrieve the retail site market research data from the market research database 105, decrypt the retail site market research data and then decode the decrypted data into different data fields for subsequent processing in the market research data decoder 110. The market research data decoder 110 of FIG. 3 also includes a sold product parser 335 to parse out sold product information included in the retail site research data decoded by the retail site data decoder 330. In an example implementation, the sold product parser 335 parses any or all of sold item brand identification information, sold item type information (e.g., item name, product type, etc.), sold item amount per unit information (e.g., quantity per unit, unit size, etc.), sold unit quantity information (e.g., quantity of units, etc.), sold time information (e.g., a timestamp), etc., for each item included in the retail site market research data decoded by the retail site data decoder 330.

Additionally, the example market research data decoder 110 of FIG. 3 includes a retail location parser 340 to parse out retail location information included in the retail site market research data decoded by the retail site data decoder 330. For example, the retail location information may include a retail site name and/or location, etc., corresponding to where each item included in the retail site market research data decoded by the retail site data decoder 330 was sold. Furthermore, the example market research data decoder 110 also includes a sale price parser 345 to parse out price information included in the retail site market research data decoded by the retail site data decoder 330. For example, price information parsed by the sale price parser 345 may include any or all of regular pricing information, promotional (e.g., discount) pricing information, etc., for each item included in the retail site market research data decoded by the retail site data decoder 330.

Returning to FIG. 1, the example system 100 includes a data consolidator 115 to consolidate the panelist market research data decoded by the market research data decode 110 based on one or more demographic category selections. In the illustrated example, the data consolidator 115 uses the decoded panelist market research data to determine relative expenditures per item according to a selected demographic category. The example data consolidator 115 then converts these determined relative expenditures into statistical weighting factors for use in determining a CPI for the selected demographic category. An example implementation of the data consolidator 115 is illustrated in FIG. 4A.

Figure 4A:
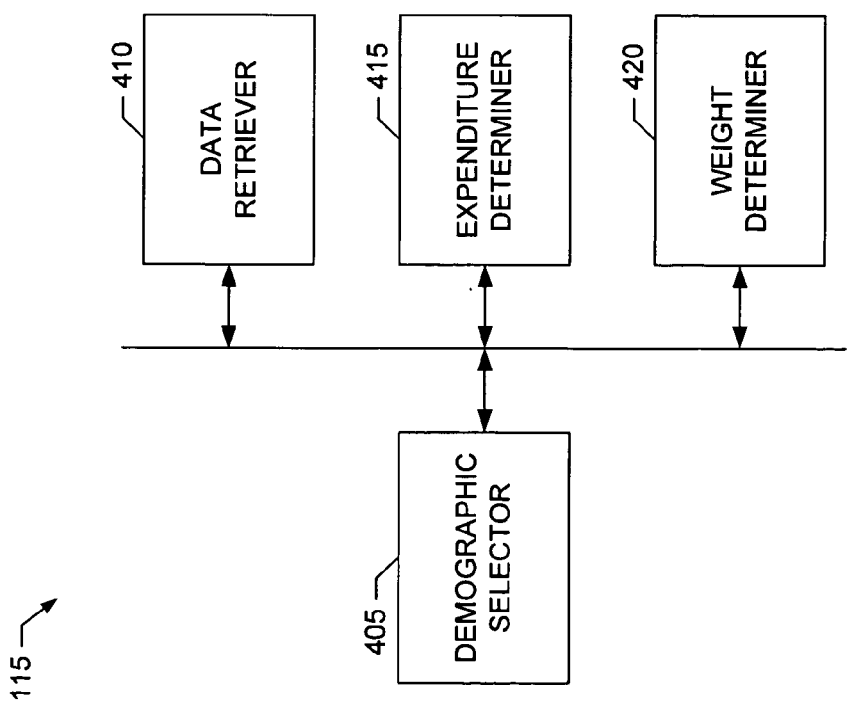
FIG. 4A is a block diagram of an example data consolidator that may be used to implement the example system of FIG. 1.

Turning to FIG. 4A, the data consolidator 115 of the illustrated example includes a demographic selector 405 to obtain demographic selection information for use in determining a CPI for a specific demographic. As discussed above, the demographic information may specify, for example, a household income, age, race/ethnicity, location/geographic region, etc., or any combination thereof, for which the system 100 is to determine a CPI. In an example implementation, the demographic selector 405 is configured to obtain the demographic selection information via a user interface, as discussed in greater detail below.

The example data consolidator 115 of FIG. 4A further includes a data retriever 410 to retrieve the panelist market research data decoded and parsed by, for example, the market research data decoder 110 of FIG. 1. For example, the market research data decoder 110 may store the decoded and parsed panelist market research data in the market research database 105 and/or another storage location not shown in FIG. 1. The example data retriever 410 is configured to retrieve the decoded and parsed panelist market research data according to selected demographic information provided by the demographic selector 405. For example, based on the selected demographic information provided by the demographic selector 405, the example data retriever 410 may retrieve decoded and parsed panelist market research data for only a specified household income, age, race/ethnicity, location, etc., or any combination thereof. To support determination of price differentials, the example data retriever 410 may retrieve the decoded and parsed panelist market research data corresponding to the time intervals between which the price differential is to be determined. The time interval corresponding to particular decoded and parsed panelist market research data may be determined from, for example, purchased time information included in the market research data.

To process the decoded and parsed panelist market research data retrieved by the data retriever 410 to determine relative expenditures per item for a selected demographic category, the example data consolidator 115 of FIG. 4A includes an expenditure determiner 415. In an example implementation, the expenditure determiner 415 is configured to determine the average total consumer expenditure represented by the decoded and parsed panelist market research data retrieved by the data retriever 410 using the demographic information specified by the demographic selector 405. In this example, the expenditure determiner 415 then determines the average percentage of the total expenditure allocated to each item to be included in the CPI for the specified demographic category. Furthermore, to support determination of price differentials, the example expenditure determiner 415 may determine the relative expenditures per item for each set of retrieved decoded and parsed panelist market research data corresponding to the time intervals between which the price differential is to be determined. As discussed in greater detail below, the relative expenditures for each item are then combined to determine overall relative expenditures for each of the item strata used for CPI determination. A table 450 illustrating a set of example overall relative expenditures determined for a corresponding set of item strata to be used for CPI determination is shown in FIG. 4B.

The example data consolidator 115 of FIG. 4A also includes a weight determiner 420 to convert the relative expenditures determined by the expenditure determiner 415 into relative expenditure weights that may be used for CPI determination. For example, the relative expenditure weights determined by the weight determiner 420 may be used to weight the prices of respective items when determining an item's contribution to the overall CPI. In an example implementation, the weight determiner 420 converts the relative expenditures determined by the expenditure determiner 415 from a percentage format to a numerical scale factor. Furthermore, to support determination of price differentials, the example weight determiner 420 may determine the relative expenditures weights for each set of relative expenditures corresponding to the time intervals between which the price differential is to be determined.

In some example implementations, the example data consolidator 115 of FIG. 4A is configured to compare purchased pricing information included in the decoded and parsed panelist market research data with sold pricing information included in the decoded and parsed retail site market research data. By comparing this information, the data consolidator 115 can determine which items represented by the panelist market research data were purchased at a regular price v. a promoted (e.g., discounted) price. The data consolidator 115 can then determine relative expenditures and corresponding relative expenditure weights for items purchased at a regular price v. at a promoted price. As discussed in greater detail below, these separate relative expenditure weights may be used to determine CPIs capable of distinguishing between regular prices and promoted prices.

Returning to FIG. 1, the example system 100 further includes an equivalent unit pricing processor 120 to determine an equivalent unit price for each group of items in an item stratum of the CPI having substantially similar attributes except for an amount per unit. As discussed above, the universe of consumer items is typically divided into a plurality of item strata used to determine a CPI. In the example system 100, the equivalent unit pricing processor 120 examines the items included in each item stratum and combines the items into common groups having substantially similar attributes except for an amount per unit. For example, the equivalent unit pricing processor 120 may combine items having common brand information, product name/type, etc., but sold in different unit quantities or sizes. The equivalent unit pricing processor 120 normalizes each group of common items to an equivalent amount per unit (e.g., unit size, quantity per unit, etc.) and then determines an equivalent unit price and a corresponding relative expenditure weight for an equivalent item representative of the group of common items.

As an illustrated example, consider a group of common items containing regular Pepsi® soda sold as individual cans, and in 6-pack, 12-pack and 24-pack quantities. In this example, the equivalent unit pricing processor 120 normalizes the price associated with each item in the common group by a respective amount per unit associated with the item. For example, the equivalent unit pricing processor 120 may divide the price of a 6-pack by 6, the price of the 12-pack by 12 and the price of a 24-pack by 24. Next, the equivalent unit pricing processor 120 determines the equivalent normalized price by: (i) scaling each normalized price by the respective amount per unit and the total units sold for the respective item, (ii) accumulating the scaled normalized prices and (iii) dividing the accumulated scaled normalized prices by the total scaled quantity of all of the common items sold. For example, if the retail price of regular Pepsi® soda sold as individual cans, and in 6-pack, 12-pack and 24-pack quantities is $0.50, $2.50, $3.99 and $5.99, respectively, and respective units of regular Pepsi® soda sold as individual cans, and in 6-pack, 12-pack and 24-pack quantities is 500, 150, 100 and 75, then the equivalent normalized price is given by Equation 1 as follows:

$$P_{norm} = \frac{\left(\frac{.50}{1} \cdot 1 \cdot 500\right) + \left(\frac{2.50}{6} \cdot 6 \cdot 150\right) + \left(\frac{3.99}{12} \cdot 12 \cdot 100\right) + \left(\frac{5.99}{24} \cdot 24 \cdot 75\right)}{(1 \cdot 500) + (6 \cdot 150) + (12 \cdot 100) + (24 \cdot 75)} = \$0.335.$$

Equation 1

Next, the equivalent unit pricing processor 120 determines an equivalent unit price for an equivalent item representative of the group of common items by scaling the equivalent normalized price by the desired unit size of the equivalent item to be used to represent the group of common items. Continuing the above example, if the equivalent item representative of the group of common regular Pepsi® soda products sold as cans is a single can, then the equivalent normalized price for a can of regular Pepsi® soda is given by Equation 2 as follows:

$$P_{equiv} = \$0.335 \cdot 1 = \$0.335 \qquad \text{Equation 2}$$

As an alternative example, if the equivalent normalized price for common regular Pepsi® soda products is to be determined on a per-ounce basis, the equivalent normalized price for regular Pepsi® soda would be $P_{equiv}=\$0.335/12=\$0.028$ (assuming a can holds 12 ounces of soda). In such an example, normalizing to a quantity of an ounce would allow inclusion of other packaging types, such as one- and two-liter bottles. In contrast, rather than using any type of equivalent item representative or equivalent unit price, conventional CPI determination techniques typically just use the most popular size/quantity to represent a particular item. As such, conventional CPI determination techniques are vulnerable to changes in an item's size/quantity popularity.

Along with determining the equivalent unit price for an equivalent item representative of the group of common items, the equivalent unit pricing processor 120 also determines a corresponding common group relative expenditure weight using the relative expenditure weights determined by the data consolidator 115 for the individual items included in the common item group. In an example implementation, the equivalent unit pricing processor 120 accumulates the relative expenditure weights for all items included in the common group to determine the common group relative expenditure weights for the equivalent item representative of the common item group.

Furthermore, in some example implementations the equivalent unit pricing processor 120 is configured to determine a separate equivalent unit price corresponding to regular prices for the group of common items (i.e., an equivalent unit regular price), and a separate equivalent unit price corresponding to promoted (e.g., discount) prices for the group of common items (i.e., an equivalent unit promoted price). An example implementation of the equivalent unit pricing processor is illustrated in FIG. 5.

Figure 5:
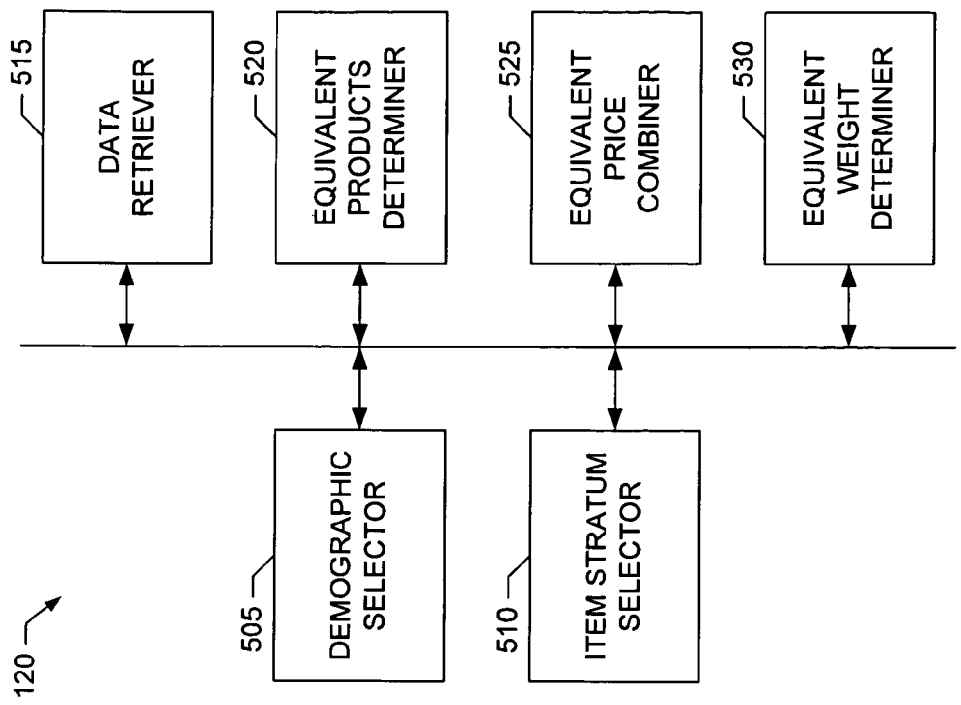
FIG. 5 is a block diagram of an example equivalent unit pricing processor that may be used to implement the example system of FIG. 1.

Turning to FIG. 5, the equivalent unit pricing processor 120 of the illustrated example includes a demographic selector 505 to obtain demographic selection information for use in determining a CPI for a specific demographic. As discussed above, the demographic information may specify, for example, a household income, age, race/ethnicity, location, etc., or any combination thereof, for which the system 100 is to determine a CPI. In an example implementation, the demographic selector 505 is configured to obtain the demographic selection information via a user interface, as discussed in greater detail below.

The equivalent unit pricing processor 120 of FIG. 5 also includes an item stratum selector 510 to enable selection of a particular item stratum for which weighted equivalent unit pricing is to be determined. As discussed above, the universe of consumer items (e.g., goods and services) to be included in a CPI is divided into a plurality of item strata. The item stratum selector 510 selects a particular item stratum for processing. In an example implementation, the item stratum selector 510 is configured to cycle through a specified set of item strata to be included in a particular CPI based on CPE type information obtained via a user interface, as discussed in greater detail below.

The example equivalent unit pricing processor 120 of FIG. 5 further includes a data retriever 515 to retrieve the retail site market research data decoded and parsed by, for example, the market research data decoder 110 of FIG. 1. For example, the market research data decoder 110 may store the decoded and parsed retail site market research data in the market research database 105 and/or another storage location not shown in FIG. 1. The example data retriever 515 is configured to retrieve the decoded and parsed retail site market research data corresponding to the selected demographic information provided by the demographic selector 505 and the particular item stratum specified by the item stratum selector 510. For example, based on the selected demographic information provided by the demographic selector 505, the example data retriever 515 may retrieve decoded and parsed panelist market research data corresponding to only those items included in the specified item stratum (e.g., based on a set of specified item attributes as discussed below) and for only those retail sites located in a specified geographic region, corresponding to a specific type or retail site (e.g., grocery store, drug store, convenience store, department store, mass merchandising outlet, discount outlet, Internet e-store, etc.), etc. To support determination of price differentials, the example data retriever 515 may retrieve the decoded and parsed retail site market research data corresponding to the time intervals between which the price differential is to be determined. The time interval corresponding to particular decoded and parsed retail site market research data may be determined from, for example, sale time information included in the retail site market research data.

To determine groups of common items included in the item stratum specified by the item stratum specifier 510, the example equivalent unit pricing processor 120 of FIG. 5 also includes an equivalent products determiner 520. The equivalent products determiner 520 examines the items included in each specified item stratum and combines the items into groups having substantially similar attributes except for an amount per unit. In an example implementation, the equivalent products determiner 520 combines items having common brand information, product name/type, etc., but sold in different unit quantities or sizes.

To determine equivalent unit prices for the groups of common items determined by the equivalent products determiner 520, the example equivalent unit pricing processor 120 of FIG. 5 includes an equivalent price combiner 525. As discussed above, for each common item group, the equivalent price combiner 525 is configured to (a) determine a normalized price for each item in the common group, (b) determine an equivalent normalized price for the common group and (c) determine an equivalent unit price for an equivalent item representative of the common group. In an example implementation, the equivalent price combiner 525 determines the normalized price, $P_{norm,i}$, for an item i by dividing the sale price of the item, $P_i$, for the item by the amount per unit, $Q_i$, in which the item i is sold, represented mathematically in Equation 3 as follows:

$$P_{norm,i} = P_i/Q_i \qquad \text{Equation 3}$$

The sale price, $P_i$, and the amount per unit, $Q_i$, may be determined from the decoded and parsed market research data retrieved by the data retriever 515 for the particular item, i. For example, the sale price, $P_i$, may be determined by performing an average of the pricing for the item, i, across all retail sites included in the retrieved data, weighted by the number of units sold at each retail site). The amount per unit, $Q_i$, may be a quantity per unit, a unit size, etc.

In an example implementation, the equivalent price combiner 525 determines the equivalent normalized price, $P_{norm,G}$, for the common item group by: (i) scaling the normalized price, $P_{norm,i}$, for each item in the group, G, by the respective amount per unit, $Q_i$, and the total units sold, $N_i$, for the respective item, (ii) accumulating the scaled normalized prices and (iii) dividing the accumulated scaled normalized prices by the total scaled quantity of all of the common items sold. Mathematically, the equivalent normalized price, $P_{norm,G}$, for the common items group, G, is represented by Equation 4 as follows:

$$P_{norm,G} = \frac{\sum_{i \in G} P_{norm,i} \cdot Q_i \cdot N_i}{\sum_{i \in G} Q_i \cdot N_i}.$$

Equation 4

Using the determined equivalent normalized price, $P_{equiv,G}$, the equivalent price combiner 525 then determined an equivalent unit price for an equivalent item representative of the common item group by scaling the equivalent normalized price by the desired unit size, $Q_G$, of the equivalent item to be used to represent the common group of items, G. Mathematically, the equivalent unit price, $P_{equiv,G}$, for the common item group, G, is represented by Equation 5 as follows:

$$P_{equiv,G} = Q_G \cdot P_{norm,G}$$

Equation 5

The example equivalent unit pricing processor 120 of FIG. 5 further includes an equivalent weight determiner 530 to determine a relative expenditure weight for each common item group determined by the equivalent products determiner 520. In an example implementation, the equivalent weight determiner 530 determines a common group relative expenditure weight for the group of common items by combining the relative expenditure weights determined by the example data consolidator 112 for each item included in the common group. In such an example implementation, the relative expenditure weights for individual items may be retrieved by the data retriever 515 for all items included in the item stratum being processed as specified by the item stratum selector 510. The data consolidator 115 may store the determined relative expenditures in the market research database 105 and/or another storage location not shown in FIG. 1 to support retrieval by the data retriever 515.

In an example implementation, the equivalent weight determiner 530 combines the relative expenditure weights, $r_i$, for each item, i, in a common item group, G, by accumulating the relative expenditure weights. The resulting common group relative expenditure weight, $r_{equiv, G}$, for the common group, G, may be expressed mathematically by Equation 6 as follows:

$$r_{equiv,G} = \sum_{i \in G} r_i$$

Equation 6

The combination of the equivalent unit price, $P_{equiv, G}$, and the corresponding common group relative expenditure weight, $r_{equiv, G}$, forms a weighted equivalent unit price for the group of common items, G, included in the selected item stratum being processed.

In some example implementations, the example equivalent unit pricing processor 120 of FIG. 5 is configured to determine separate equivalent unit prices corresponding to regular v. promoted (e.g., discounted) prices for the items included in a common item group. In such implementations, the equivalent unit pricing processor 120 will use the mathematical expressions described above to determine an equivalent unit regular price, $P_{equiv, reg, G}$, for each common item group, G, by combining only the regular prices, $P_{reg, i}$, for the items included the common group. Similarly, in such implementations, the equivalent unit pricing processor 120 will use the mathematical expressions described above to determine an equivalent unit promoted price, $P_{equiv,pro, G}$, for each common item group, G, by combining only the promoted (e.g., discounted) prices, $P_{pro,i}$, for the items included the common group. Furthermore, in such example implementations, the equivalent unit price described above which is determined using all of the available pricing information for items included in the common group (e.g., both the regular and promoted prices) is referred to as an equivalent unit average price for the common item group of items.

Additionally, to determine appropriate common group relative expenditure weights for the separate equivalent unit regular prices and equivalent unit promoted prices, the example equivalent weight determine 530 in such example implementations is configured to determine separate common group relative expenditure weights corresponding to regular v. promoted pricing. For example, as discussed above in connection with FIG. 4A, the example data consolidator 115 can be configured to process the available panelist and retail site market research data to determine separate relative expenditure weights for items sold at regular v. promoted prices. The equivalent weight determiner 530 may then use the separate relevant expenditure weights to determine common group relative expenditure weights for regular v. promoted pricing. For example, to determine an common group relative expenditure weight, $r_{equiv, reg, G}$, for a group of common items, G, sold at regular prices, the equivalent weight determiner 530 may use the mathematical expressions described above to combine the relative expenditure weights, $r_{reg,i}$, for items, i, in the group that were sold at regular prices. Similarly, to determine an common group relative expenditure weight, $r_{equiv,pro, G}$, for a group of common items, G, sold at promoted (e.g., discounted) prices, the equivalent weight determiner 530 may use the mathematical expressions described above to combine the relative expenditure weights, $r_{pro, i}$, for items, i, in the group that were sold at promoted prices. The resulting combinations of equivalent unit regular prices and promoted prices, $P_{equiv, reg, G}$ and $P_{equiv,pro, G}$, with the respective corresponding common group relative expenditure weights for regular and promoted pricing, $r_{reg, i}$ and $r_{pro, i}$, form weighted equivalent unit regular and promoted prices for the group of common items, G, included in the selected item stratum being processed.

Returning to FIG. 1, the example system 100 includes a product reference dictionary database 125 to store a product reference dictionary listing attributes associated with all consumer items (e.g., goods, services, etc.) for which pricing information can be obtained and, thus, which are capable of inclusion in a determined CPI. The product reference dictionary stored in the product reference dictionary database 125 is used by the example system 100 to specify the item strata used for CPI determination. As discussed above, the universe of consumer items (e.g., goods and services) to be included in the CPI is divided into a plurality of item strata. In the example system 100, rather than preselecting which items are to be included in each item stratum, each item stratum is defined by specifying a set of item attributes to associate items with the particular item stratum. Examples of item attributes that may be used to define an item stratum include item type, item name, item brand, item style, item flavor, item form, item amount per unit, etc. Any item having the specified set of attributes can be included in the item stratum defined by the set of attributes. In this way, new products can be used for CPI determination as soon as they are introduced into the marketplace, rather than waiting for an arbitrary forced substitution update to occur. Additionally, item stratum can be easily redefined by simply updating the set of attributes defining the particular item stratum. In this way, item stratum can evolve as the items themselves evolve over time.

In an example implementation, items are uniquely identified by Uniform Product Codes (UPCs). An item's UPC is used to index an entry of the product reference dictionary 125 corresponding to the item. The product reference dictionary entry, in turn, includes a set of attributes associated with the item. Characteristic coding is used to represent the item in the product reference dictionary 125. For example, characteristic coding may be used to encode items into various classification levels of finer resolution, such as, for example, departments, categories, sub-groups, etc. Then, within the subgroup level, a set of attributes is associated with each item classified in the subgroup. An example product reference dictionary arrangement 600 depicting department, category, sub-group and attribute classifications is illustrated in FIGS. 6A-6B.

Figure 6A:
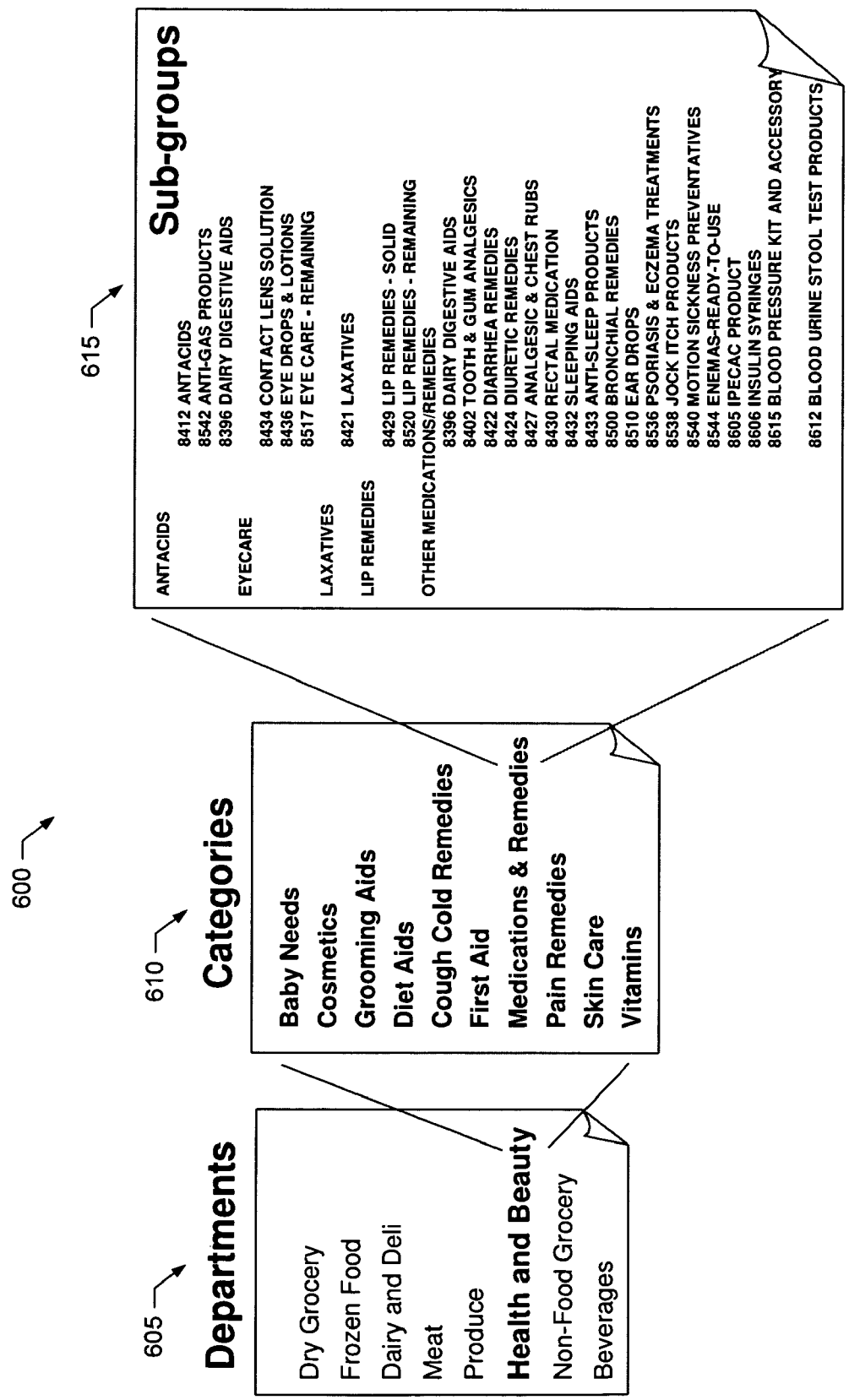

Turning to FIG. 6A, the example product reference dictionary arrangement 600 uses characteristic coding to classify items into a plurality of departments 605 as shown. Items in each department (e.g., such as the "Health and Beauty" department of the illustrated example) are then further classified into a plurality of categories 610 as shown. Furthermore, items in each category (e.g., such as the "Medications & Remedies" category of the illustrated example) are classified into a plurality of sub-groups 615 as shown. Then, turning to FIG. 6B, items in each sub-group (e.g., such as the "Diarrhea Remedies" sub-group 620 of the illustrated example) are associated with a plurality of attributes 625 corresponding to the particular item.

In an example implementation, the plurality of attributes 625 associated with an item is sufficient to uniquely characterize the item in the product reference dictionary 125. In other words, by specifying the plurality of attributes 625, the particular item associated with that plurality of attributes 625 may be identified in the product reference dictionary 125. Furthermore, by specifying a subset of the plurality of attributes 625, a group of items having the specified subset of attributes may be selected from the product reference dictionary 125. In this manner, a subset of attributes may be used to define an item stratum and select items for inclusion in the defined item stratum.

Returning to FIG. 1, to maintain the product reference dictionary stored in the product reference dictionary database 125, the example system 100 includes a product reference dictionary processor 130. The product reference dictionary processor 130 enables the addition and removal of items from the product reference dictionary database 125. Additionally, the product reference dictionary processor 130 allows item entries included in the product reference dictionary database 125 to be modified/updated. For example, an item's entry may be modified to reclassify the item into a different department, category, subgroup, etc. Furthermore, an item's entry may be updated to add new attribute information, remove obsolete attribute information, modify existing attribute information, etc. An example implementation of the product reference dictionary processor 130 is illustrated in FIG. 7.

Turning to FIG. 7, the product reference dictionary processor 130 of the illustrated example includes an entry manager 705 to manage item entries included in the product reference dictionary database 125. For example, the entry manager 705 is able to add entries for new items or remove entries for non-existent items (e.g., items no longer available in the marketplace). In an example implementation, the entry manager 705 is configured to add an item entry in the product reference dictionary database 125 by allocating memory for the entry and indexing the start of the allocated memory using the UPC corresponding to the item. To remove an item's entry, the example entry manager 705 locates the allocated memory indexed by the UPC for the particular item and de-allocates the associated memory. Additionally, the entry manager 705 can be configured to support updating of item entries by, for example, changing the UPC used to index a particular item's entry.

The example product reference dictionary processor 130 of FIG. 7 also includes a department classifier 710 to classify an item into a particular department. In an example implementation, the department classifier 710 may employ characteristic coding and associate a unique department code with each possible department. To classify an item into a particular department, the department classifier 710 adds the department code for the appropriate department to the item's entry in the product reference dictionary database 125. Additionally, to reclassify an item into a different department, the department classifier 710 locates the existing department code in the item's entry and replaces it with a new department code corresponding to the new department into which the item is being classified.

To support classification of items into categories within departments, the example product reference dictionary processor 130 of FIG. 7 also includes a category classifier 715. In an example implementation, the category classifier 715 may employ characteristic coding and associate a unique category code with each possible category within a department. To classify an item into a particular category, the category classifier 715 adds the category code for the appropriate category to the item's entry in the product reference dictionary database 125. Additionally, to reclassify an item into a different category, the category classifier 715 locates the existing category code in the item's entry and replaces it with a new category code corresponding to the new category into which the item is being classified.

To support classification of items into subgroups within categories, the example product reference dictionary processor 130 of FIG. 7 also includes a subgroup classifier 720. In an example implementation, the subgroup classifier 720 may employ characteristic coding and associate a unique subgroup code with each possible subgroup within a category. To classify an item into a particular subgroup, the subgroup classifier 720 adds the subgroup code for the appropriate subgroup to the item's entry in the product reference dictionary database 125. Additionally, to reclassify an item into a different subgroup, the subgroup classifier 720 locates the existing subgroup code in the item's entry and replaces it with a new subgroup code corresponding to the new subgroup into which the item is being classified The example product reference dictionary processor 130 of FIG. 7 further includes an attribute specifier 725 to enable specification of attributes associated with an item. In an example implementation, the attribute specifier 725 employs characteristic coding and associates unique attribute codes with each possible attribute that can be associated with an item. For example, the attribute specifier 725 may employ unique attribute codes for different item types, different item brands, different item styles, different item forms, different item sizes, different item flavors, etc. To specify a particular attribute for an item, the attribute specifier 725 adds the attribute code for the particular attribute to the item's entry in the product reference dictionary database 125. Additionally, the attribute specifier 725 of the illustrated example may remove and/or update attribute codes included in an item's entry as appropriate to maintain a current and accurate specification of the item's attributes.

Returning to FIG. 1, the example system 100 also includes an item strata specifier 135 to define the item strata for use in CPI determination. As discussed above, the universe of consumer items (e.g., goods and services) to be included in a CPI is divided into a plurality of item strata. In the example system 100, each item stratum is defined by specifying a set of item attributes to associate items with the particular item stratum. To define a particular item stratum, the item strata specifier 135 specifies a set of attributes associated with the item stratum. An item may then be included in the particular item stratum by comparing the set of attributes defining the item stratum with the attributes included in the item's entry of the product reference dictionary database 125. An example implementation of the item strata specifier 135 is illustrated in FIG. 8.

Turning to FIG. 8, the item strata specifier 135 of the illustrated example includes an attribute selector 805 to specify the attributes associated with each of the item strata used for CPI determination. In an example implementation, the attribute selector 805 is configured to present possible attributes via a user interface as discussed in greater detail below. For example, the attribute selector 805 may be configured to traverse the product reference dictionary database 125 to identify all possible attributes associated with all item entries. The example attribute selector 805 may then collate the attributes by subgroup, category, department, etc., for presentation in an organized manner. Attributes may then be specified for a particular item stratum and provided to an item stratum mapper 810.

The example item strata specifier 135 of FIG. 8 includes the item stratum mapper 810 to enable a set of specified attributes to be used to define a particular item stratum. In an example implementation, the item stratum mapper 810 maintains an item strata map in, for example, the product reference dictionary database 125 and/or another storage location not shown in FIG. 1. The item strata map includes an entry for each item stratum. Each map entry includes the specified attributes defining the particular item stratum. The item strata map maintained by the item stratum mapper 810 may be accessed by, for example, other elements of the example system 100 to determine which items to include in a particular item stratum by comparing the item's attributes with the specified attributes defining the item stratum.

Returning to FIG. 1, the example system 100 further includes a CPI processor 140 to determine CPIs based on, for example, a specified CPI demographic and a specified CPI type. To determine a CPI, the CPI processor 140 is configured to determine price differentials for each item stratum included in the CPI being determined for the specified CPI demographic and the specified CPI type. In particular, the CPI processor 140 determines a price differential for a particular item stratum by combining pricing information obtained from the market research database 105 for any item having an item entry in the product reference dictionary database 125 whose attributes match the set of attributes defining the particular item stratum as specified by the item strata specifier 135. Furthermore, in the illustrated example, the pricing information combined by the CPI processor 140 to determine the pricing differentials comprise the weighted equivalent unit prices determined by the equivalent unit pricing processor 120.

For example, based on the specified CPI type, the CPI processor 140 may combine: (i) the equivalent unit regular prices determined by the equivalent unit pricing processor 120 to determine regular pricing differentials for each item stratum comprising the CPI, (ii) the equivalent unit promoted prices determined by the equivalent unit pricing processor 120 to determine promoted (e.g., discount) pricing differentials for each item stratum comprising the CPI, and/or (iii) the equivalent unit average prices determined by the equivalent unit pricing processor 120 to determine average pricing differentials for each item stratum comprising the CPI. To determine a price differential between two specified time periods, the CPI processor 140 of the illustrated example determines a pricing ratio of the pricing information (e.g., equivalent unit regular prices, equivalent unit promoted prices, equivalent unit average prices, etc.) for each item (or equivalent item representing a group of common items) for the two time periods corresponding to the pricing differential time period. The CPI processor 140 then combines the determined pricing ratios for each item (or equivalent item representing a group of common items) included in an item stratum to determine the pricing differential for the item stratum between the two time periods. Then, the pricing differentials determined for each item stratum are combined using the relative expenditure weights determined by the data consolidator 115 and/or equivalent unit pricing processor 120 to determine the CPI for the specified CPI demographic and CPI type. An example implementation of the CPI processor 140 is illustrated in FIG. 9.

Figure 9:
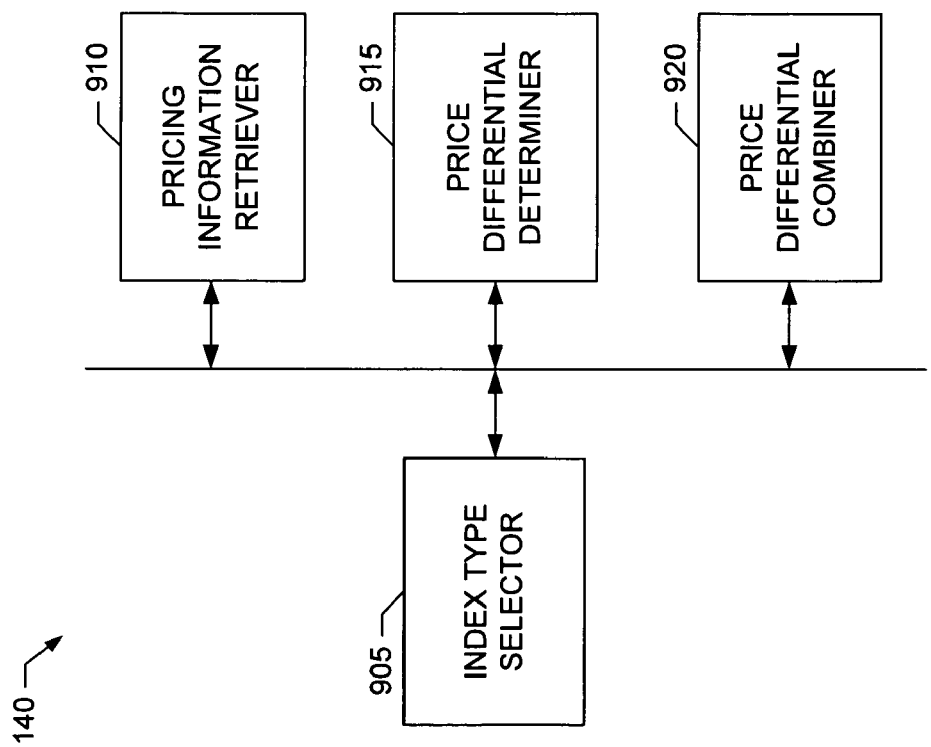
FIG. 9 is a block diagram of an example consumer price index processor that may be used to implement the example system of FIG. 1.

Turning to FIG. 9, the CPI processor 140 of the illustrated example includes an index type selector 905 to obtain CPI type information for use in determining the specified type of CPI. Example CPI types include, for example, an average price CPI measuring price differentials for the average prices of items included in the CPI, a regular price CPI measuring price differentials for the regular prices of items included in the CPI, a promoted price CPI measuring price differentials for the promoted prices of items included in the CPI, etc. In an example implementation, the index type selector 905 is configured to obtain the CPI type selection information via a user interface, as discussed in greater detail below.

The example CPI processor 140 of FIG. 9 also includes a pricing information retriever 910 to retrieve weighted pricing information for use in determining the CPI according to the CPI type specified by the index type selector 905. In an example implementation, based on the specified CPI type, the pricing information retriever 910 is configured to retrieve the weighted equivalent unit average prices, the weighted equivalent unit regular prices and/or the weighted equivalent unit promoted prices determined by the equivalent unit pricing processor 120 for a specified CPI demographic as discussed above. For example, the equivalent unit pricing processor 120 may store its determined weighted equivalent unit pricing information in the market research database 105 and/or another storage location not shown in FIG. 1. To support determination of price differentials, the example pricing information retriever 910 may retrieve the appropriate weighted equivalent unit pricing information (e.g., average, regular, promoted, etc.) for the time intervals between which the price differential is to be determined. The time interval corresponding to particular weighted equivalent unit pricing information may be determined from, for example, timestamps stored with the weighted equivalent unit pricing information.

In the following, the weighted equivalent unit pricing information (e.g., average, regular, promoted, etc.) retrieved by the pricing information retriever 910 is represented mathematically as the equivalent unit prices $P_{equiv,\ G,\ t}$ and $P_{equiv,\ G,\ t-1}$, and the corresponding common group relative expenditure weights $r_{equiv,\ G,\ t}$ and $r_{equiv,\ G,\ t-1}$, for the equivalent item representing the common item group G for the time periods t and t-1, respectively. As discussed above, in an example implementation the equivalent unit prices and corresponding common group relative expenditure weights are determined by the equivalent unit pricing processor 120 for groups of common items included in each item stratum used to determine the CPI. Each item stratum is defined by specifying a set of attributes from, for example, the product reference dictionary database 125. The set of attributes may be specified to correspond to a particular CPI demographic. The groups of common items in each item stratum are formed by selecting items having substantially similar attributes except for an amount per unit (e.g., quantity per unit, unit size, etc.). An equivalent item having an equivalent unit size is used to represent the group of common items. The appropriate equivalent unit prices (e.g., average, regular, promoted, etc.) with corresponding common group relative expenditure weights are then determined by the equivalent unit pricing processor 120 for the equivalent item representing the common item group for each time period between which a price differential is to be determined.

Returning to FIG. 9, the CPI processor 140 of the illustrated example further includes a price differential determiner 915 to determine pricing differentials for each item stratum included in the CPI being determined by the CPI processor 140. In an example implementation, the price differential determiner 915 is configured to determine a price differential for a particular item stratum, S, by: (i) determining a price ratio using the equivalent unit prices $P_{equiv,\ G,\ t}$ and $P_{equiv,\ G,\ t-1}$, for each group of common items, G, included in the item stratum, S, and for the time periods t and t-1 between which the price differential is to be determined; and (ii) combining all of the price ratios determined for the item stratum, S, to determine the price differential, $\Delta_{S,t,t-1}$, for the item stratum, S, between the time periods t and t-1.

In some example implementations, a geometric mean is used to combine the price ratios for a given item stratum, S. In such implementation, the price differential, $\Delta_{S,t,t-1}$, for the item stratum, S, between the time periods t and t-1 can be represented mathematically using Equation 7 as follows:

$$\Delta_{S,t,t-1} = \prod_{G \in S} \left( \frac{P_{equiv,G,t}}{P_{equiv,G,t-1}} \right)^{\frac{1}{N_G}}. \qquad \text{Equation 7}$$

In Equation 7, $N_G$ represents the number of common item groups, G, included in the item stratum, S. For completeness, a common item group, G, can include only one item, thus allowing Equation 7 to fully represent the price differential corresponding to all items included in the item stratum, S. Also, different pricing differentials, $\Delta_{S,t,t-1}$, can be determined for any or all of the equivalent unit average prices, equivalent unit regular prices, equivalent unit promoted prices, etc., determined by the equivalent unit pricing processor 120 based on the CPI type specified by the index type selector 905.

To combine the determined price differentials for each item stratum into a CPI, the example CPI processor 140 of FIG. 9 further includes a price differential combiner 920. In an example implementation, the price differential combiner 920 combines the price differentials, $\Delta_{S,t,t-1}$, determined by the price differential determiner 915 for the CPI type specified by the index type selector 905. For example, the price differential combiner 920 can be configured by the index type selector 905 to combine the price differentials, $\Delta_{S,t,t-1}$, corresponding to equivalent unit average prices to determine a CPI measuring average price changes. Additionally or alternatively, the price differential combiner 920 can be configured by the index type selector 905 to combine the price differentials, $\Delta_{S,t,t-1}$, corresponding to equivalent unit regular prices to determine a CPI measuring regular price changes. Additionally or alternatively, the price differential combiner 920 can be configured by the index type selector 905 to combine the price differentials, $\Delta_{S,t,t-1}$, corresponding to equivalent unit promoted prices to determine a CPI measuring promoted price changes. Because the price differentials being combined are determined from equivalent unit prices determined by the equivalent unit pricing processor 120 for those item stratum included in a specified the CPI demographic, the resulting CPI(s) determined by the price differential combiner 920 also correspond to the same specified CPI demographic.

In an example implementation, the price differential combiner 920 combines the price differentials, $\Delta_{S,t,t-1}$, according to the overall relative expenditure weights $r_{equiv,\ S,\ t}$ and $r_{equiv,\ S,\ t-1}$, determined for each respective item stratum, S, for the time periods t and t-1 measured by the CPI being determined. The price differential combiner 920 determines an overall relative expenditure weight, $r_{equiv,\ S,\ t-1}$, for an item stratum, S, by combining the common group relative expenditure weights $r_{equiv,\ G,\ t}$, corresponding to each common item group included in the item stratum, S. In an example implementation, the common group relative expenditure weights $r_{equiv,\ G,\ t}$, corresponding to each common item group included in the item stratum, S, are accumulated to determine the overall relative expenditure weight, $r_{equiv,\ S,\ t}$, for an item stratum, S. Mathematically, the overall relative expenditure weight, $r_{equiv,\ S,\ t}$, for an item stratum, S, is represented by Equation 8 as follows:

$$r_{equiv,S,t} = \sum_{G \in S} r_{equiv,G,t}. \qquad \text{Equation 8}$$

Next, the price differential combiner 920 combines the price differentials, $\Delta_{S,t,t-1}$, and the overall relative expenditure weights $r_{equiv,\ S,\ t}$ and $r_{equiv,\ S,\ t-1}$, determined for each respective item stratum, S, to determine a CPI. In an example implementation, the resulting CPI determined for the time periods t and t-1, denoted $CPI_{t,\ t-1}$, is represented mathematically by the expression in Equation 9 as follows:

$$CPI_{t,t-1} = \prod_{\forall S} (\Delta_{S,t,t-1})^{\frac{1}{2}(r_{equiv,S,t} + r_{equiv,S,t-1})}. \qquad \text{Equation 9}$$

As mentioned above, different CPIs, $CPI_{t,\ t-1}$, can be determined for any or all of the average item prices, regular item prices, promoted item prices, etc., based on the CPI type specified by the example index type selector 905.

Returning to FIG. 1, the example system 100 includes a user interface 145 to enable configuration of the CPI(s) to be determined by the example system 100. The example user interface 145 may be implemented by, for example, a graphical user interface (GUI) enabling a user to enter configuration information and/or to display possible configuration selections (e.g., such as possible attributes for configuring an item stratum). In an example implementation, the configuration information entered via the user interface 145 includes, for example, demographic configuration information, item stratum attribute specification information, CPI type configuration information, etc. For example, the demographic configuration information may specify a household income, age, race/ethnicity, location, etc., or any combination thereof, for which the system 100 is to determine a CPI. The item stratum attribute specification information specifies, for example, item attributes from the product reference dictionary database 125 to be used to associate items with each item stratum used for CPI determination. The CPI type configuration information specifies whether the system 100 should determine CPIs measuring, for example, average item prices, regular item prices, promoted item prices, etc.

Flowcharts representative of example machine readable instructions that may be executed to implement any or all of the example system 100, the example market research data decoder 110, the example data consolidator 115, the example equivalent unit pricing processor 120, the example product reference dictionary processor 130, the example item strata specifier 135, the example CPI processor 140, the example user interface 145, the example panelist data decoder 305, the example purchased product parser 310, the example demographic parser 315, the example purchase location parser 320, the example purchase price parser 325, the example retail site data decoder 330, the example sold product parser 335, the example retail location parser 340, the example sale price parser 345, the example demographic selector 405, the example data retriever 410, the example expenditure determiner 415, the example weight determiner 420, the example demographic selector 505, the example item stratum selector 510, the example data retriever 515, the example equivalent products determiner 520, the example equivalent price combiner 525, the example equivalent weight determiner 530, the example entry manager 705, the example department classifier 710, the example category classifier 715, the example subgroup classifier 720, the example attribute specifier 725, the example attribute selector 805, the example item stratum mapper 810, the example index type selector 905, the example pricing information retriever 910, the example price differential determiner 915, and/or the example price differential combiner 920 are shown in FIGS. 10-15. In these examples, the machine readable instructions represented by each flowchart may comprise one or more programs for execution by: (a) a processor, such as the processor 1612 shown in the example computer 1600 discussed below in connection with FIG. 16, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1612, but the entire program or programs and/or portions thereof could alternatively be executed by a device other than the processor 1612 and/or embodied in firmware or dedicated hardware (e.g., implemented by an application specific integrated circuit (ASIC), a programmable logic device (PLD), a field programmable logic device (FPLD), discrete logic, etc.). For example, any or all of the example system 100, the example market research data decoder 110, the example data consolidator 115, the example equivalent unit pricing processor 120, the example product reference dictionary processor 130, the example item strata specifier 135, the example CPI processor 140, the example user interface 145, the example panelist data decoder 305, the example purchased product parser 310, the example demographic parser 315, the example purchase location parser 320, the example purchase price parser 325, the example retail site data decoder 330, the example sold product parser 335, the example retail location parser 340, the example sale price parser 345, the example demographic selector 405, the example data retriever 410, the example expenditure determiner 415, the example weight determiner 420, the example demographic selector 505, the example item stratum selector 510, the example data retriever 515, the example equivalent products determiner 520, the example equivalent price combiner 525, the example equivalent weight determiner 530, the example entry manager 705, the example department classifier 710, the example category classifier 715, the example subgroup classifier 720, the example attribute specifier 725, the example attribute selector 805, the example item stratum mapper 810, the example index type selector 905, the example pricing information retriever 910, the example price differential determiner 915, and/or the example price differential combiner 920 could be implemented by any combination of software, hardware, and/or firmware. Also, some or all of the machine readable instructions represented by the flowcharts of FIGS. 10-15 may be implemented manually. Further, although the example machine readable instructions are described with reference to the flowcharts illustrated in FIGS. 10-15, many other techniques for implementing the example methods and apparatus described herein may alternatively be used. For example, with reference to the flowcharts illustrated in FIGS. 10-15, the order of execution of the blocks may be changed, and/or some of the blocks described may be changed, eliminated, combined and/or subdivided into multiple blocks.

Figure 10:
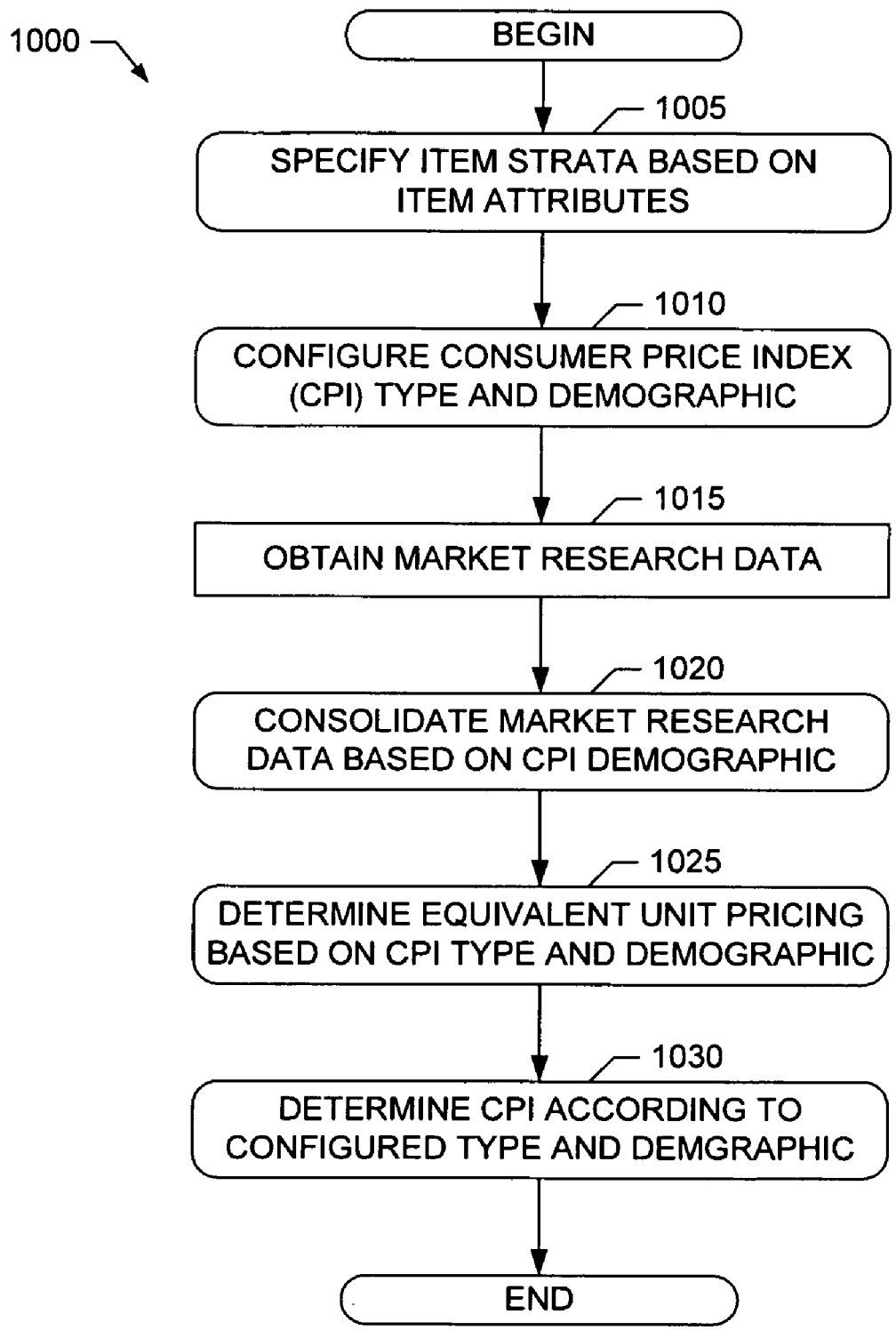
FIG. 10 is a flowchart representative of example machine readable instructions that may be executed to implement the example system of FIG. 1.
Figure 11:
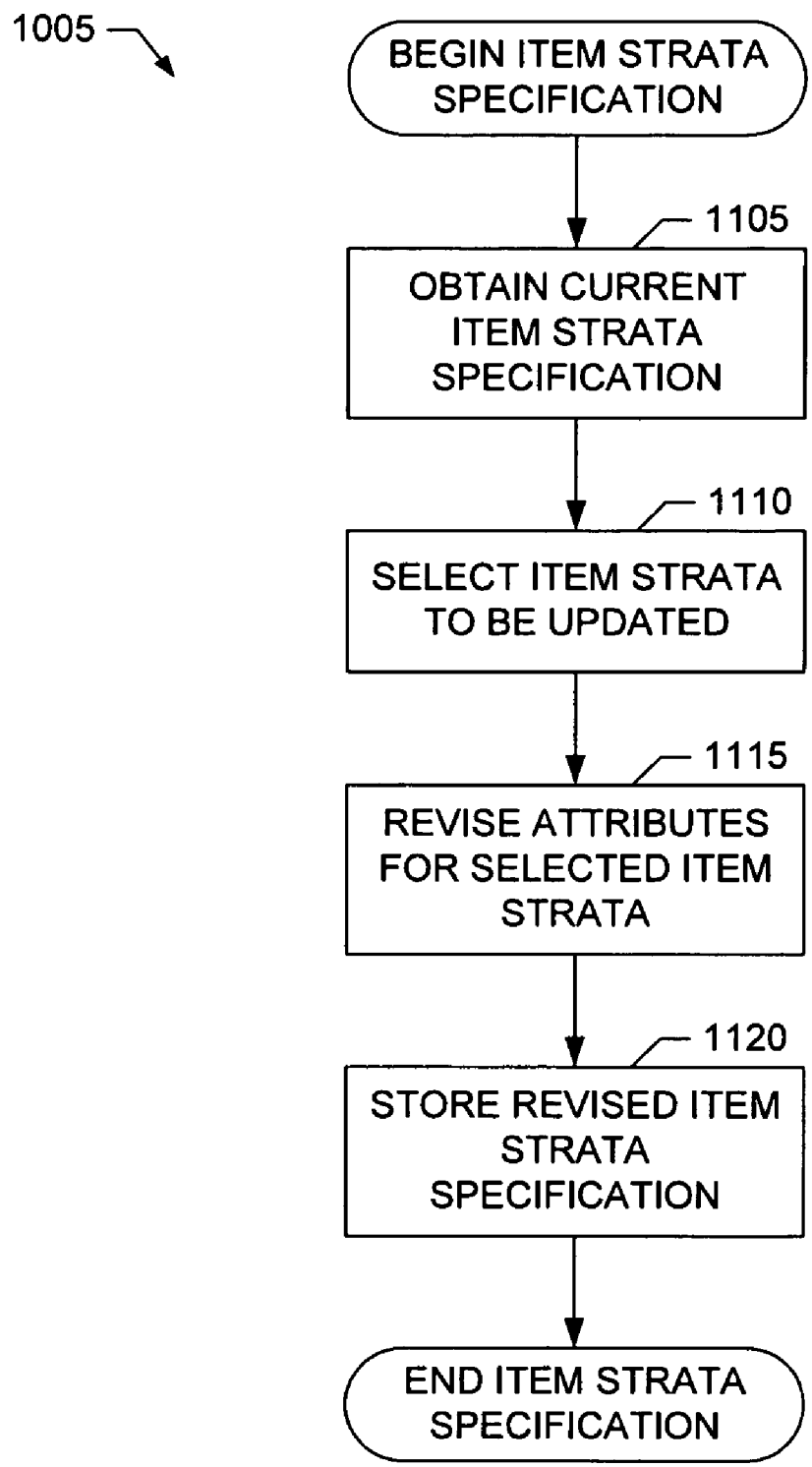
FIG. 11 is a flowchart representative of example machine readable instructions that may be executed to perform item strata specification to implement the example machine readable instructions of FIG. 10, the example system of FIG. 1 and/or the example item strata specifier of FIG. 8.

Example machine readable instructions 1000 that may be executed to implement the example system 100 of FIG. 1 are shown in FIG. 10. The example machine readable instructions 1000 may be executed at predetermined intervals to determine and publish one or more CPIs corresponding to a predetermined measurement frequency. Additionally or alternatively, the example machine readable instructions 1000 may be executed based on an occurrence of a predetermined event, such as in response to a user request to generate one or more CPIs. The machine readable instructions 1000 begin execution at block 1005 at which the item strata specifier 135 specifies the item attributes defining each item stratum of the item strata to be used for CPI determination. Example machine readable instructions that may be used to implement the processing at block 1005 are illustrated in FIG. 11 and discussed in greater detail below.

Figure 12:
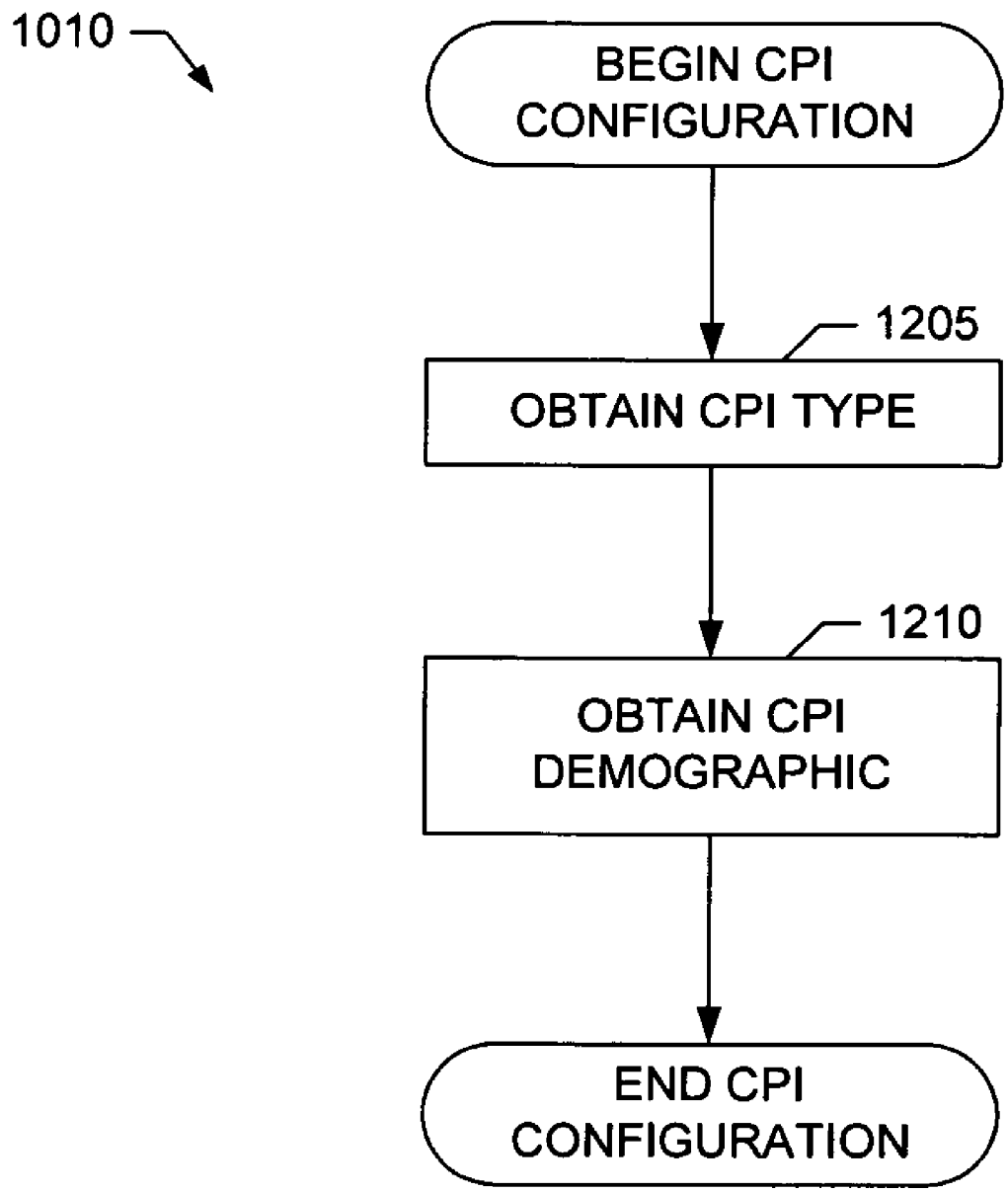
FIG. 12 is a flowchart representative of example machine readable instructions that may be executed to perform consumer price index configuration to implement the example machine readable instructions of FIG. 10 and/or the example system of FIG. 1.

Next, control proceeds to block 1010 at which the user interface 145 is used to configure a CPI type and demographic for the particular CPI to be determined by the example system 100. Example machine readable instructions that may be used to implement the processing at block 101 are illustrated in FIG. 12 and discussed in greater detail below. Control next proceeds to block 1015 at which the example system 1015 obtains the market research data to be used for CPI determination. For example, and as discussed above, the example data collection system 200 of FIG. 2 may be used to collect panelist market research data, retail site market research data and/or third party market research data describing consumer purchasing behavior. In such an example, at block 1015 the example system 100 may obtain the panelist market research data, retail site market research data and/or third party market research data collected by the example data collection system 200 and store this market research data in the market research database 105.

Figure 13:
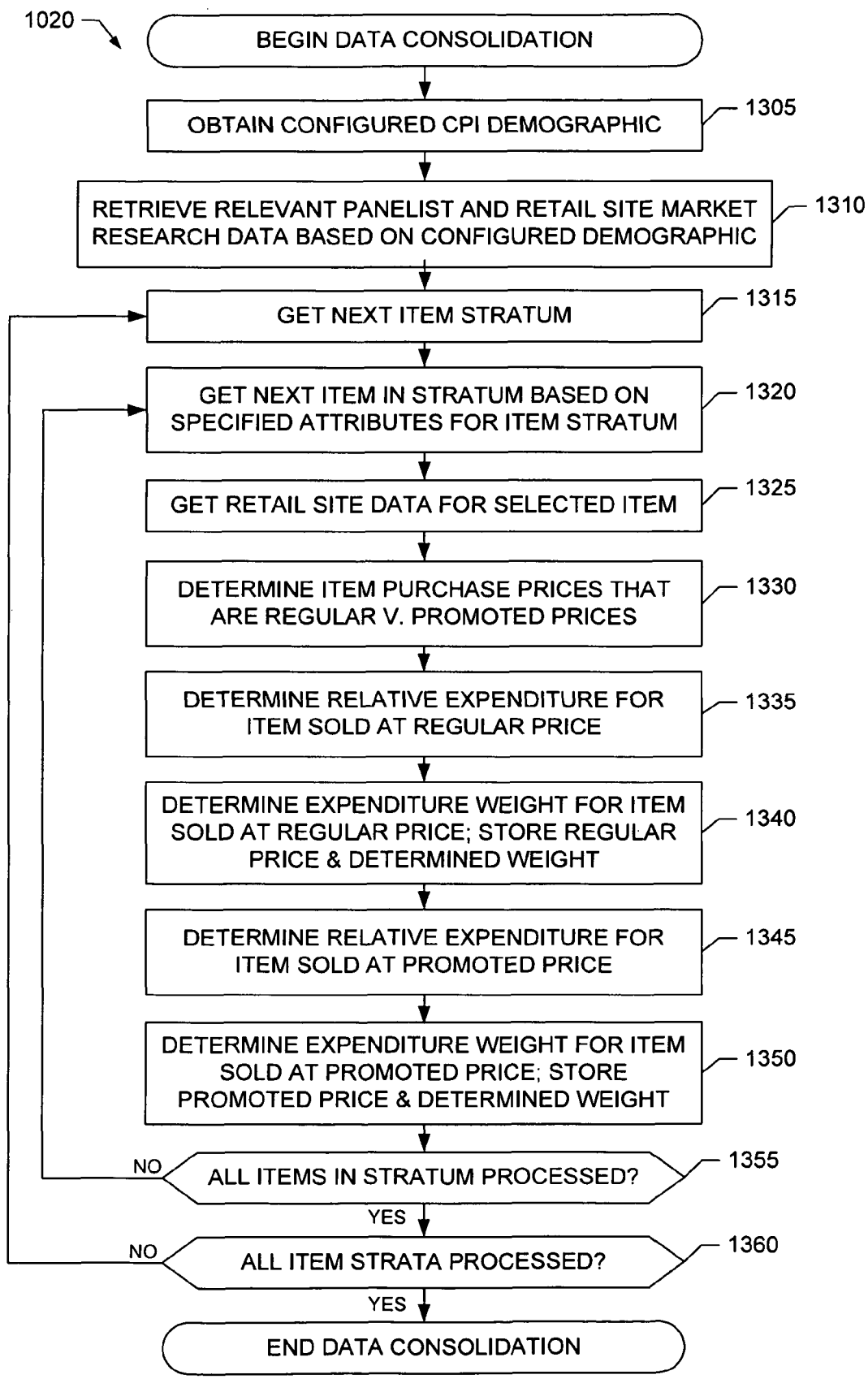
FIG. 13 is a flowchart representative of example machine readable instructions that may be executed to perform data consolidation to implement the example machine readable instructions of FIG. 10, the example system of FIG. 1 and/or the example data consolidator of FIG. 4A.

After the market research data is stored at block 1015, control proceeds to block 1020 at which the data consolidator 115 consolidates the panelist market research data obtained at block 1015 based on one or more demographic category selections obtained at block 1010. In particular, at block 1020 the data consolidator 115 uses the panelist market research data to determine relative expenditures per item according to a selected demographic category, and then converts these determined relative expenditures into statistical weighting factors for use in determining a CPI for the selected demographic category. Example machine readable instructions that may be used to implement the processing at block 1020 are illustrated in FIG. 13 and discussed in greater detail below.

Figure 14A:
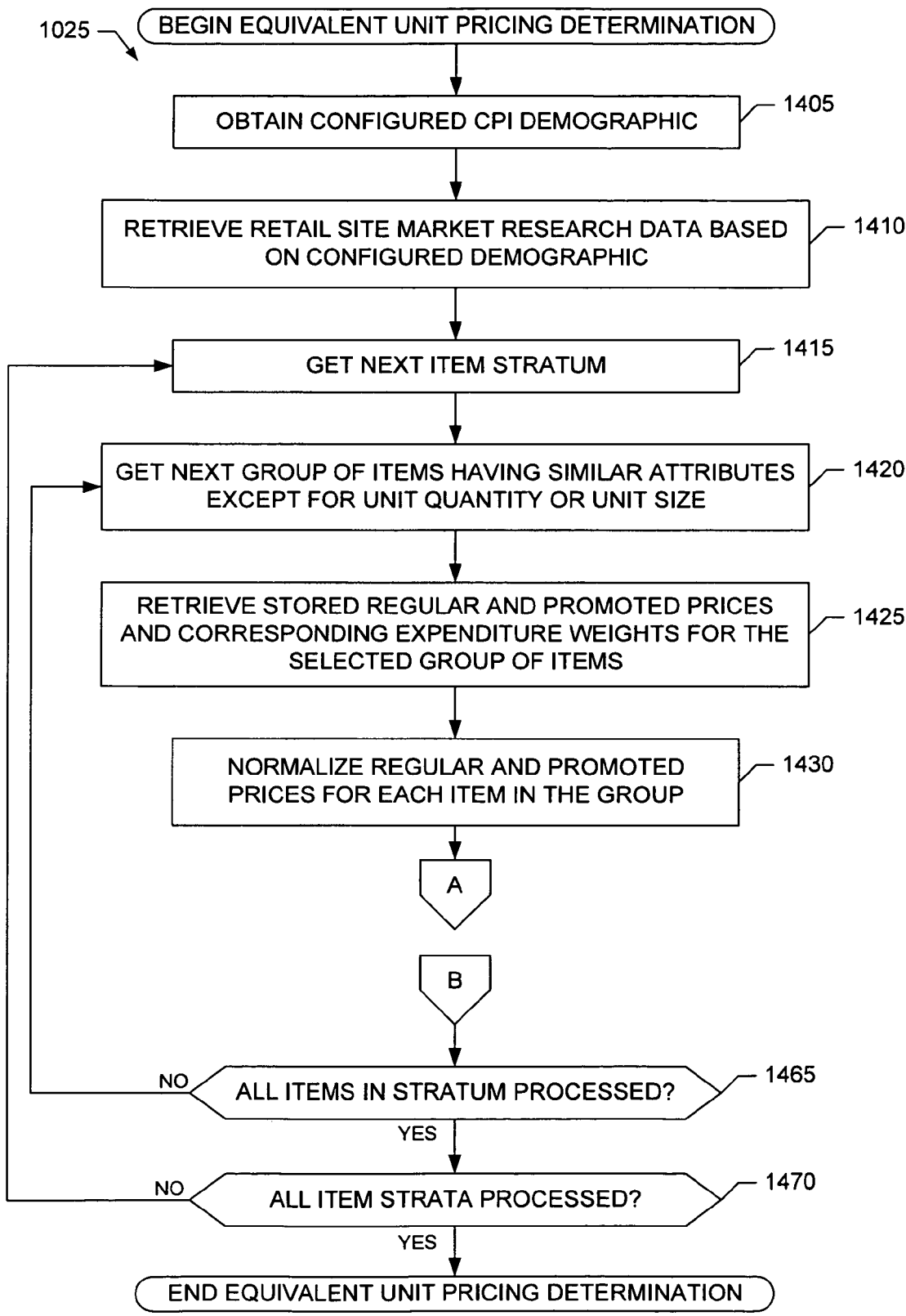
FIGS. 14A-14B collectively form a flowchart representative of example machine readable instructions that may be executed to perform equivalent unit pricing determination to implement the example machine readable instructions of FIG. 10, the example system of FIG. 1 and/or the example equivalent unit pricing processor of FIG. 5.
Figure 14B:
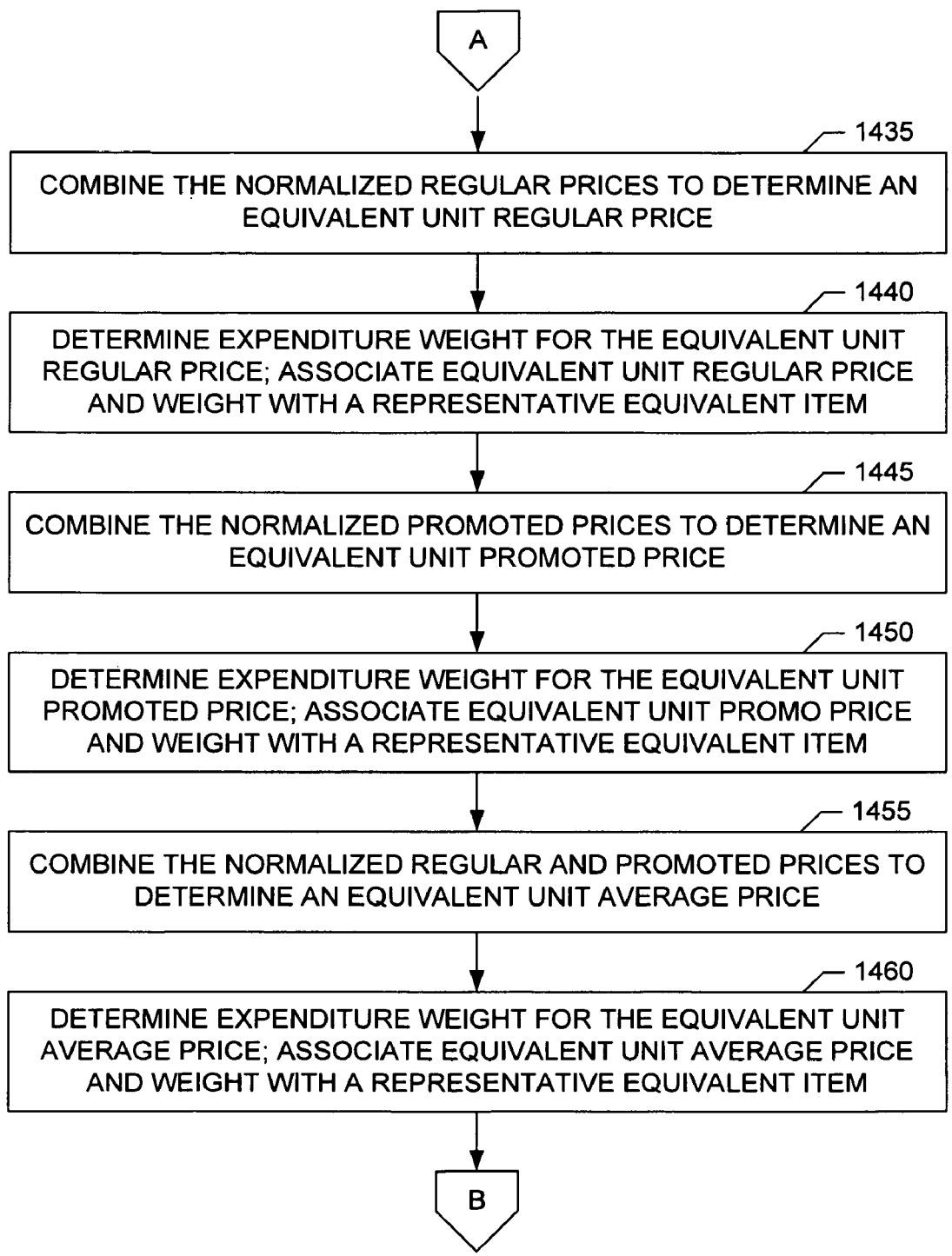

Next, control proceeds to block 1025 at which the equivalent unit pricing processor 120 processes the retail site market research data obtained at block 1015 to determine groups of common items belonging to each item stratum specified at block 1005. In particular, at block 1025 the equivalent unit pricing processor 120 identifies groups of common items included in each item stratum having substantially similar attributes except for an amount per unit. Then, for each identified group of common items, the equivalent unit pricing processor 120 determines an equivalent unit price using the obtained retail site market data. Additionally, at block 1025 the equivalent unit pricing processor 120 also determines a corresponding common group relative expenditure weight using the relative expenditure weights determined at block 1020 for each item in the common group. Example machine readable instructions that may be used to implement the processing at block 1025 are illustrated in FIGS. 14A-14B and discussed in greater detail below.

Figure 15:
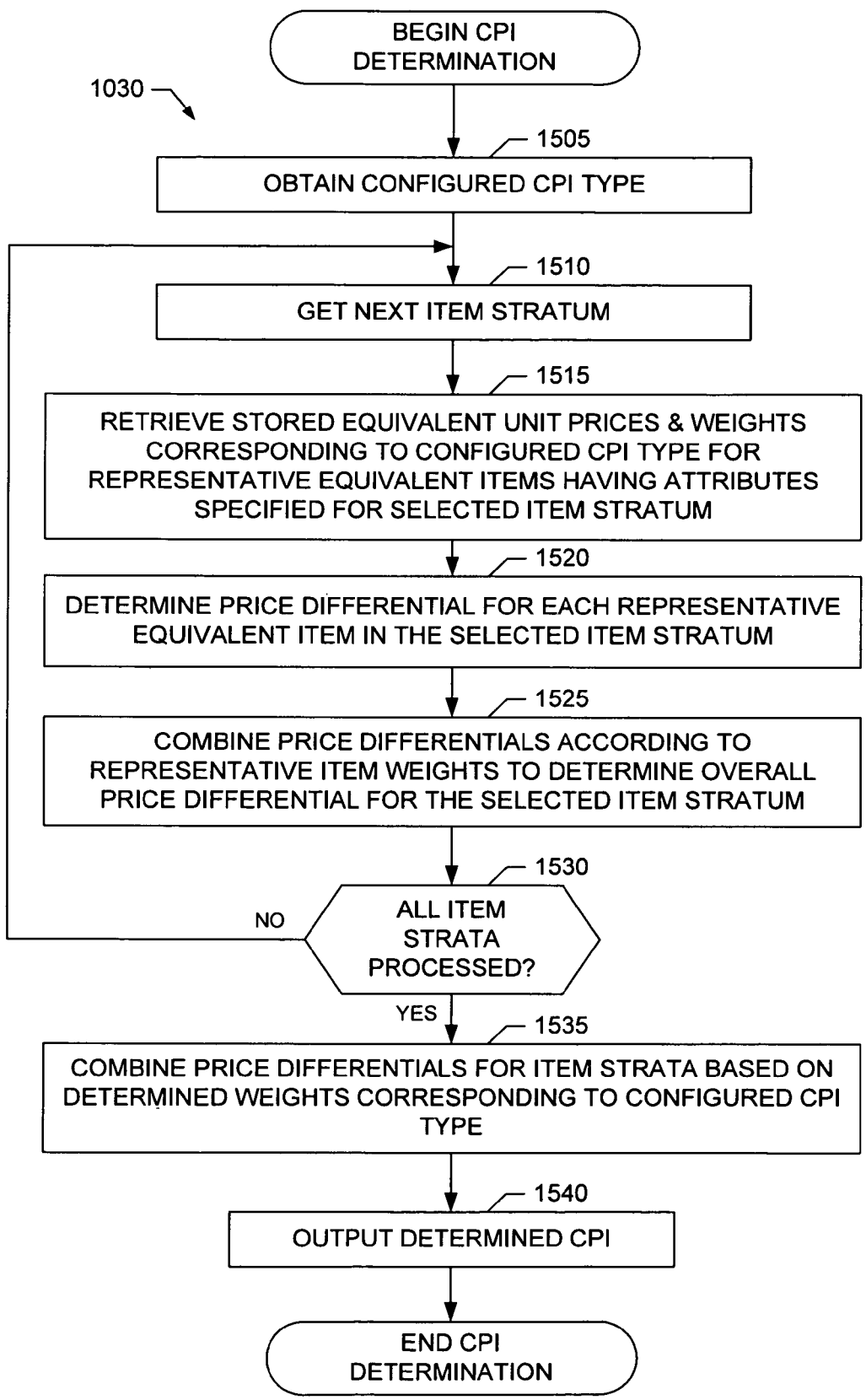
FIG. 15 is a flowchart representative of example machine readable instructions that may be executed to perform consumer pricing index determination to implement the example machine readable instructions of FIG. 10, the example system of FIG. 1 and/or the example consumer price index processor of FIG. 9.

Control next proceeds to block 1030 at which the CPI processor 140 determines one or more CPIs using the weighted equivalent unit pricing information determined at block 1025 and the CPI type information specified at block 1010. Example machine readable instructions that may be used to implement the processing at block 1030 are illustrated in FIG. 15 and discussed in greater detail below. After processing at block 1030 completes, execution of the example machine readable instructions 1000 ends.

Example machine readable instructions 1005 that may be executed to implement the example item strata specifier 135 of FIG. 1 and/or 8, and/or the processing at block 1005 of FIG. 10 are shown in FIG. 11. The example machine readable instructions 1005 of FIG. 11 begin execution at block 1105 at which the example item strata specifier 135 obtains the current item strata defined for use in CPI determination. For example, the current item strata may be represented by an item strata map maintained by the item stratum mapper 810 included in the example item strata specifier 135.

In an example implementation, at block 1105 the item stratum mapper 810 obtains the current item strata map, which may be empty or contain item stratum entries specified during a previous execution of the example machine readable instructions 1005. As discussed above, the item strata map obtained at block 1105 includes entries for each item stratum, and each item entry includes the item attributes specified as defining the particular item stratum. Items having the specified attributes defining a particular item stratum will be assigned to that item stratum for CPI determination.

After the current item strata specification (e.g., such as the item strata map) is obtained at block 1105, control proceeds to block 1110 at which the item strata specifier 135 selects the item strata to be updated. For example, at block 1110 the attribute selector 805 included in the example item strata specifier 135 may select one or more item stratum to update. During a first execution of the example machine readable instructions 1005, the attribute selector 805 may enable all item strata to be defined via, for example, the user interface 145. Then, during subsequent executions of the example machine readable instructions 1005, the attribute selector 805 may enable some or all of the item strata to be updated and/or redefined via, for example, the user interface 145. After the item strata to be updated are selected at block 1110, control proceeds to block 1115.

At block 1115, the example item strata specifier 135 enables revision of the attributes defining the item strata selected at block 1110. For example, during a first execution of the example machine readable instructions 1005, the attribute selector 805 included in the example item strata specifier 135 may enable specification via the user interface 145 of the item attributes for each item stratum to be used for CPI determination. Then, during subsequent executions of the example machine readable instructions 1005, the attribute selector 805 may enable revision via the user interface 145 of the attributes defining the item strata selected at block 1110. To enable specification of item stratum attributes, at block 1115 the attribute selector 805 may also process the product reference dictionary database 125 to determine and collate all possible item attributes for presentation to a user via the user interface 145. Attributes may then be specified for a particular item stratum by the attribute selector 805 from configuration information obtained via the user interface 145.

Next, control proceeds to block 1120 at which the example item strata specifier 135 stores the revised item strata whose attributes were specified at block 1115. For example, at block 1120 the item stratum mapper 810 may update the item strata map entries for each item stratum whose attributes were specified/revised at block 1115. The updated item strata map is then available for use by other elements of the example system 100 to determine which items to be included in a particular item stratum by comparing an item's attributes with the specified attributes defining the item stratum. After processing at block 1120 completes, execution of the example machine readable instructions 1005 ends.

Example machine readable instructions 1010 that may be executed to perform the processing at block 1010 of FIG. 10 are shown in FIG. 12. The example machine readable instructions 1010 of FIG. 12 begin execution at block 1205 at which the example user interface 145 obtains a CPI type to be used to configure the type(s) of CPI to be determined by the example system 100. For example, the CPI type obtained at block 1205 specifies whether the system 100 should determine CPIs measuring, for example, average item prices, regular item prices, promoted (e.g., discounted) item prices, etc. After the CPI type is obtained at block 1205, control proceeds to block 1210.

At block 1210 the example user interface 145 obtains CPI demographic information used to configure the demographic category or categories covered by the CPI to be determined by the example system 100. For example, the CPI demographic information obtained at block 1210 may specify a household income, age, race/ethnicity, location, etc., or any combination thereof, for which the system 100 is to determine a CPI. After the CPI demographic information is obtained at block 1210, execution of the example machine readable instructions 1010 ends.

Example machine readable instructions 1020 that may be executed to implement the example data consolidator 115 of FIG. 1 and/or 4A, and/or the processing at block 1020 of FIG. 10 are shown in FIG. 13. The example machine readable instructions 1020 of FIG. 13 begin execution at block 1305 at which the example data consolidator 115 obtains the configured CPI demographic to be used for CPI determination. As discussed above, the demographic information may specify, for example, a household income, age, race/ethnicity, location, etc., or any combination thereof, for which a CPI is to be determined. In an example implementation, at block 1305 the demographic selector 405 included in the example data consolidator 115 obtains the CPI demographic information via the user interface 145.

Control then proceeds to block 1310 at which the example data consolidator 115 retrieves the relevant panelist and retail site market research data corresponding to the configured CPI demographic obtained at block 1305. For example, at block 1310 the example data retriever 410 included in the example data consolidator 115 may retrieve panelist and/or retail site market research data from the market research database 105 for only a specified household income, age, race/ethnicity, location, etc., or any combination thereof based on the configured CPI demographic. To support determination of price differentials, at block 1310 the example data retriever 410 may retrieve the panelist and/or retail site market research data corresponding to the time intervals between which price differentials are to be measured by the CPI undergoing determination. The time interval corresponding to particular panelist and/or retail site market research data may be determined from, for example, purchase and/or sale time information included in the market research data.

Next, the example data consolidator 115 determines a relative expenditure weight for each item matching the attributes defining an item stratum of the CPI being determined and represented in the demographically relevant panelist and/or retail site market research data retrieved at block 1310. In particular, at block 1315 the example data consolidator 115 gets the next item stratum to be processed. Then, at block 1320 the example data consolidator 115 gets the next item matching the attributes defining the particular item stratum selected at block 1315. For example, at block 1320 the data consolidator 115 examines the item information included in the panelist market research data retrieved at block 1310 and selects the next item represented in the data whose item attributes match the specified attributes defining the item stratum selected at block 1315. Control then proceeds to block 1325 at which the example data consolidator 115 processes the retail site market research retrieved at block 1310 and gets the retail site data corresponding to the item selected at block 1320. Control then proceeds to block 1330.

Beginning at block 1330, the example data consolidator 115 determines relative expenditure weights for the item selected at block 1320 for various retail prices. For example, the data consolidator 115 can determine relative expenditure weights for the item purchased at a regular price and purchased at a promoted (e.g., discounted price), as well as a relative expenditure weight for the item purchased at an average price (e.g., such as the average of the regular and promoted prices). With this in mind, at block 1330 the example data consolidator 115 compares the retail site market research data selected at block 1325 for the item selected at block 1320 to the item's purchase price(s) listed in the panelist market research data obtained at block 1310 to determine whether the item's price(s) correspond to regular v. promoted sale prices. As discussed above, the retail site market research data may include sale pricing information indicating whether the sale price corresponds to a regular v. a promoted price. At block 1330, the example data consolidator 115 can compare the retail site regular v. promoted pricing information to the item's purchase prices listed in the panelist market research data to determine which purchase prices correspond to a regular price v. a promoted price. After determining which item purchase price(s) in the panelist market research data correspond to regular v. promoted purchase price, control proceeds to block 1335.

At block 1335 the example data consolidator 115 determines a relative expenditure for the item selected at block 1320 and sold at a regular price. For example, at 1335 the expenditure determiner 415 included in the example data consolidator 115 may process the panelist market research data and the item entries identified at block 1330 that correspond to a regular purchase price to determine an average percentage of total panelist expenditure allocated to the item selected at block 1320 and sold at a regular price. Furthermore, to support determination of price differentials, at block 1335 the example expenditure determiner 415 may determine the relative expenditure for the selected item sold at a regular price for the time intervals between which price differentials are to be measured by the CPI undergoing determination.

After the relative expenditure for the selected item sold at a regular price is determined at block 1335, control proceeds to block 1340 at which the example data consolidator 115 converts the relative expenditure determined at block 1335 to a corresponding relative expenditure weight for the item sold at a regular price. For example, the weight determiner 420 included in the example data consolidator 115 may convert the determined relative expenditure from a percentage format to a numerical scale factor. Additionally, at block 1340 the resulting relative expenditure weight for the item sold at a regular price is stored in, for example, the market research database 105 and/or any other appropriate storage location for subsequent use in CPI determination.

Next, control proceeds to block 1350 at which the example data consolidator 115 determines a relative expenditure for the item selected at block 1320 and sold at a promoted (e.g., discounted) price. For example, at block 1345 the expenditure determiner 415 included in the example data consolidator 115 may process the panelist market research data and the item entries identified at block 1330 that correspond to a promoted purchase price to determine an average percentage of total panelist expenditure allocated to the item selected at block 1320 and sold at a promoted price. Furthermore, to support determination of price differentials, at block 1345 the example expenditure determiner 415 may determine the relative expenditure for the selected item sold at a promoted price for the time intervals between which price differentials are to be measured by the CPI undergoing determination.

After the relative expenditure for the selected item sold at a promoted price is determined at block 1345, control proceeds to block 1350 at which the example data consolidator 115 converts the relative expenditure determined at block 1345 to a corresponding relative expenditure weight for the item sold at a promoted price. For example, the weight determiner 420 included in the example data consolidator 115 may convert the determined relative expenditure from a percentage format to a numerical scale factor. Additionally, at block 1350 the resulting relative expenditure weight for the item sold at a promoted price is stored in, for example, the market research database 105 and/or any other appropriate storage location for subsequent use in CPI determination.

Next, control proceeds to block 1355 at which the example data consolidator 115 determines whether all items matching the attributes defining the item stratum selected at block 1315 have been processed. If all items have not been processed (block 1355), control returns to block 1320 and blocks subsequent thereto at which the data consolidator 115 gets the next item matching the attributes defining the selected item stratum for which relative expenditure weight information is to be determined. However, if all items matching the attributes defining the selected item stratum have been processed (block 1355), control proceeds to block 1360 at which the data consolidator determines whether all item strata have been processed. If all item strata for the CPI undergoing determination have not been processed (block 1360), control returns to block 1315 and blocks subsequent thereto at which the example data consolidator 115 gets the next item stratum to be processed. If, however, all item strata have been processed (block 1360), execution of the example machine readable instructions 1020 ends.

Example machine readable instructions 1025 that may be executed to implement the example equivalent unit pricing processor 120 of FIG. 1 and/or 5, and/or the processing at block 1025 of FIG. 10 are shown in FIGS. 14A-14B. The example machine readable instructions 1025 begin execution at block 1405 of FIG. 14A at which the example equivalent unit pricing processor 120 obtains the configured CPI demographic to be used for CPI determination. As discussed above, the demographic information may specify, for example, a household income, age, race/ethnicity, location, etc., or any combination thereof, for which a CPI is to be determined. In an example implementation, at block 1405 the demographic selector 505 included in the example equivalent unit pricing processor 120 obtains the CPI demographic information via the user interface 145.

Control then proceeds to block 1410 at which the example equivalent unit pricing processor 120 retrieves the relevant retail site market research data corresponding to the configured CPI demographic obtained at block 1405. For example, at block 1410 the example data retriever 510 included in the example equivalent unit pricing processor 120 may retrieve retail site market research data from the market research database 105 for only a specified geographic region, retail store location, retail store type, retail store name, etc., or any combination thereof based on the configured CPI demographic. To support determination of price differentials, at block 1410 the example data retriever 510 may retrieve the retail site market research data corresponding to the time intervals between which price differentials are to be measured by the CPI undergoing determination. The time interval corresponding to particular retail site market research data may be determined from, for example, sale time information included in the market research data.

Next, the example equivalent unit pricing processor 120 determines equivalent unit pricing information and corresponding relative expenditure weights for each group of common items included in an item stratum of the CPI undergoing determination and represented in the demographically relevant retail site market research data retrieved at block 1410. As discussed above, a group of common items is a group of items included in an item stratum that have substantially similar attributes (e.g., such as common brand information, product name/type, etc.) except for an amount per unit (e.g., such as different unit quantities or sizes). To determine the equivalent unit pricing information and corresponding relative expenditure weights, at block 1415 the example equivalent unit pricing processor 120 gets the next item stratum to be processed. Then, at block 1420 the example equivalent unit pricing processor 120 gets the next group of items included in the particular item stratum selected at block 1415 that have substantially similar attributes except for an amount per unit. For example, at block 1420 the equivalent products determiner 520 included in the example equivalent unit pricing processor 120 performs the following operations: (i) examining the item information included in the retail site market research data retrieved at block 1410, (ii) identifying the items represented in the data whose item attributes match the specified attributes defining the item stratum selected at block 1415, and (iii) selecting the next group of items not previously processed that have substantially similar attributes (e.g., such as common brand information, product name/type, etc.) except for an amount per unit (e.g., such as different unit quantities or sizes).

Control then proceeds to block 1425 at which the example equivalent unit pricing processor 120 retrieves the pricing information contained in the retail site market research retrieved at block 1410 for the common item group selected at block 1420. As discussed above, in an example implementation the retail site market research includes regular and promotes sale prices for the items sold by the monitored retail sites. In such an example, at block 1425 the example equivalent unit pricing processor 120 retrieves the regular and promoted prices from the retail site market research data for each item included in the common item group selected at block 1425. Next, the example equivalent unit pricing processor 120 uses the retrieved pricing information to determine equivalent unit pricing information for an equivalent item representative of the common item group selected at block 1420 by: (a) determining a normalized price for each item in the common group, (b) determining an equivalent normalized price for the common group and (c) determining an equivalent unit price for an equivalent item representative of the common group.

In particular, control next proceeds to block 1430 at which the example equivalent unit pricing processor 120 determines normalized regular prices and normalized promoted prices for each item included in the common item group selected at block 1420. For example, at block 1430 the equivalent price combiner 525 included in the example equivalent unit pricing processor 120 processes each item included in the common group and normalizes the item's regular and promoted prices by the amount per unit (e.g., quantity per unit, unit size, etc.) in which the item was sold. In an example implementation, at block 1430 the normalized regular price and the normalized promoted price are determined for each item included in the common group using Equation 3 described above. Furthermore, multiple normalized regular and/or promoted prices may be determined for each item included in the common group selected at block 1420, with each normalized regular and/or promoted price corresponding to a particular stored instance of the item in the retail site market research data retrieved at block 1410. A particular item may have multiple stored instances of information corresponding to the item being sold at different retail sites, at different times during the interval of interest being processed, etc.

After the normalized regular and promoted prices for the items included in the common group of equivalent items are determined at block 1430, control proceeds to block 1435 of FIG. 14B. At block 1435, the example equivalent unit pricing processor 120 combines the normalized regular prices determined at block 1430 for all items included in the common item group to determine an equivalent unit regular price to associate with an equivalent item representative of the common group. In an example implementation, at block 1435 the equivalent price combiner 525 included in the example equivalent unit pricing processor 120 (i) combines the normalized regular prices determined at block 1430 to determine a equivalent normalized regular price for the common item group, and then (ii) scales the equivalent normalized regular price by a desired unit amount (e.g., unit size, quantity per unit, etc.) of an equivalent item used to represent the common item group. For example, to determine the equivalent normalized regular price for the group of common items, the equivalent price combiner 525 may weight the normalized regular prices for each item by the total number of units sold for that item, and then combine the weighted normalized regular prices for each item using Equation 4 described above. Then, the equivalent price combiner 525 may use Equation 5 as described above to scale the determined equivalent normalized regular price by the desired unit size of an equivalent item to be used to represent the common group. This resulting scaled equivalent normalized regular price becomes the equivalent unit regular price for the common item group selected at block 1420.

Next, control proceeds to block 1440 at which the example equivalent unit pricing processor 120 determines a common group relative expenditure weight corresponding to the equivalent unit regular price determined at block 1435. In an example implementation, at block 1440 the equivalent weight determiner 530 included in the example equivalent unit pricing processor 120 determines a relative expenditure weight for the common item group by combining the relative expenditure weights determined by, for example, the data consolidator 115 for each of the items included in the common group and purchased at a regular price. For example, at block 1440 the equivalent weight determiner 530 may use Equation 6 as described above to accumulate the relative expenditure weights for the items included in the common group and purchased at a regular price to determine the common group relative expenditure weight corresponding to the equivalent unit regular price determined at block 1435. After determining the common group relative expenditure weight, the example equivalent unit pricing processor 120 associates the determined equivalent unit regular price and corresponding common group relative expenditure weight with the equivalent item representative of the common item group and stores this information in, for example, the market research database 105 for subsequent use in CPI determination.

Next, control proceeds to blocks 1445 and 1450 at which the example equivalent unit pricing processor 120 determines an equivalent unit promoted price and corresponding common group relative expenditure weight to associate with the equivalent item representative of the group of common items selected at block 1420. In an example implementation, the processing performed at blocks 1445 and 1450 is substantially similar to the processing performed at blocks 1435 and 1440, with the exception that promoted pricing information, instead of regular pricing information, is now processed at blocks 1445 and 1450. In particular, similar to block 1435, at block 1445 the example equivalent unit pricing processor 120 (i) combines the normalized promoted prices determined at block 1430 to determine an equivalent normalized promoted price for the common item group, and then (ii) scales the equivalent normalized promoted price by the desired unit amount (e.g., unit size, quantity per unit, etc.) of the equivalent item used to represent the common item group. Then, similar to block 1440, at block 1450 the example equivalent unit pricing processor 120 determines a common group relative expenditure weight corresponding to the equivalent unit promoted price determined at block 1435 by combining the relative expenditure weights determined by, for example, the data consolidator 115 for each of the items included in the common group and purchased at a promoted price. After determining this relative expenditure weight, the example equivalent unit pricing processor 120 associates the determined equivalent unit promoted price and corresponding common group relative expenditure weight with the equivalent item representative of the common item group and stores this information in, for example, the market research database 105 for subsequent use in CPI determination.

Next, control proceeds to block 1455 at which the example equivalent unit pricing processor 120 combines the normalized regular prices and the normalized promoted prices determined at block 1430 for all items included in the group of common items to determine an equivalent unit average price to associate with the equivalent item representative of the common group of equivalent items. In an example implementation, at block 1455 the equivalent price combiner 525 included in the example equivalent unit pricing processor 120 averages the normalized regular price and the normalized promoted price determined at block 1430 for each item included in the common group (e.g., after appropriately weighting by the respective quantities of items sold at the regular v. promoted price) to determine a normalized average price for each item. Then, similar to blocks 1435 and 1445, the example equivalent unit pricing processor 120 (i) combines the determined normalized average prices to determine an equivalent normalized average price for the common item group, and then (ii) scales the equivalent normalized average price by the desired unit amount (e.g., unit size, quantity per unit, etc.) of the equivalent item used to represent the common item group.

Next, control proceeds to block 1460 at which the example equivalent unit pricing processor 120 determines a common group relative expenditure weight corresponding to the equivalent unit average price determined at block 1455. In an example implementation, and similar to blocks 1440 and 1450, at block 1460 the equivalent weight determiner 530 included in the example equivalent unit pricing processor 120 determines a common group relative expenditure weight corresponding to the equivalent unit average price determined at block 1455 by combining the relative expenditure weights for each of the items included in the common group and purchased at either regular or promoted prices. For example, at block 1460 the equivalent weight determiner 530 may use Equation 6 as described above to accumulate the relative expenditure weights for the items included in the common group and purchased at either a regular price or promoted price (or, in other words, purchased at any price) to determine the relative expenditure weight corresponding to the equivalent unit average price determined at block 1455. After determining this relative expenditure weight, the example equivalent unit pricing processor 120 associates the determined equivalent unit average price and corresponding common relative expenditure weight with the equivalent item representative of the group of common items and stores this information in, for example, the market research database 105 for subsequent use in CPI determination. Control then proceeds to block 1465 of FIG. 14A.

At block 1465, the example equivalent unit pricing processor 120 determines whether all items included in the item stratum selected at block 1415 have been processed. If all items have not been processed (block 1465), control returns to block 1420 and blocks subsequent thereto at which the data consolidator 115 gets the next group of common items included in the selected item stratum for which equivalent unit pricing information is to be determined. However, if all items included in the selected item stratum have been processed (block 1465), control proceeds to block 1470 at which the example equivalent unit pricing processor 120 determines whether all item strata have been processed. If all item strata for the CPI undergoing determination have not been processed (block 1470), control returns to block 1415 and blocks subsequent thereto at which the example equivalent unit pricing processor 120 gets the next item stratum to be processed.

If, however, all item strata have been processed (block 1470), execution of the example machine readable instructions 1025 ends.

Example machine readable instructions 1030 that may be executed to implement the example CPI processor 140 of FIG. 1 and/or 9, and/or the processing at block 1030 of FIG. 10 are shown in FIG. 15. The example machine readable instructions 1030 of FIG. 15 begin execution at block 1505 at which the example CPI processor 140 obtains a CPI type to be used to configure the type(s) of CPI to be determined by the example system 100. The CPI type obtained at block 1505 specifies, for example, whether the CPI being determined is to measure, for example, average item prices, regular item prices, promoted (e.g., discounted) item prices, etc. In an example implementation, at block 1505 the CPI type is obtained via the example user interface 145 by the index type selector 905 included in the example CPI processor 140. After the CPI type is obtained at block 1505, control proceeds to block 1510.

At block 1510 the example CPI processor 140 gets the next item stratum to be processed to determine the CPI specified by the CPI type obtained at block 1505. As discussed above, the universe of consumer items (e.g., goods and services) to be included in the CPI is divided into a plurality of item strata. A price differential measuring a change in price between two specified time intervals is determined for each item stratum. The price differentials for all item strata are then combined to determine the CPI. Thus, at block 1510 the example CPI processor 140 gets the next stratum for which a price differential is to be determined.

Control next proceeds to block 1515 at which the example CPI processor 140 retrieves the appropriate equivalent unit prices and corresponding common group relative expenditure weights based on the CPI type obtained at block 1505. The equivalent unit prices and corresponding common group relative expenditure weights retrieved at block 1515 are determined by, for example, the equivalent unit pricing processor 120 and/or execution of the example machine readable instructions 1015 for each group of common items (e.g., for each equivalent item representative of a group of common items) included in the item stratum selected at block 1510. In an example implementation, depending on the configured CPI type, at block 1515 the example pricing information retriever 910 included in the example CPI processor 140 may retrieve (i) the equivalent unit regular prices and corresponding common group relative expenditure weights, (ii) the equivalent unit promoted (e.g., discounted) prices and corresponding common group relative expenditure weights, and/or (iii) the equivalent unit average prices and corresponding common group relative expenditure weights. As discussed above, the retrieved equivalent unit prices and corresponding common group relative expenditure weights are determined for a particular CPI demographic specified via, for example, the user interface 145.

After obtaining the equivalent unit prices and corresponding common group relative expenditure weights, control proceeds to block 1520 at which the example CPI processor 140 determines a price differential for each common item group (e.g., for each equivalent item representative of a group of common items) included in the item stratum selected at block 1510. In an example implementation, the price differential determiner 915 included in the example CPI processor 140 uses Equation 7 as described above to determine a ratio of the equivalent unit prices (e.g., equivalent unit regular prices, equivalent unit promoted prices, equivalent unit average prices, etc.) for each common item group (e.g., for each equivalent item representative of a group of common items) for two time periods for which the pricing differential time is to be measured. The resulting pricing ratio represents the price differential for the common item group (e.g., for each equivalent item representative of a group of common items) between the time intervals being measured.

After the price differentials for each common item group are determined at block 1520 for the item stratum selected at block 1510, control proceeds to block 1525. At block 1525 the example CPI processor 140 combines the determined price differential for each common item group (e.g., for each equivalent item representative of a group of common items) to determine an overall price differential for the item stratum selected at block 1510. In an example implementation, the price differential determiner 915 included in the example CPI processor 140 uses Equation 7 as described above to determine the overall price differential for the item stratum selected at block 1510 as the geometric mean of the common item group price differentials determined at block 1520.

Next, control proceeds to block 1530 at which the example CPI processor 140 determines whether all item strata have been processed. If all item strata for the CPI undergoing determination have not been processed (block 1530), control returns to block 1510 and blocks subsequent thereto at which example CPI processor 140 gets the next item stratum for which an overall price differential is to be determined. If, however, all item strata have been processed (block 1530), control proceeds to block 1535.

At block 1535, the example CPI processor 140 combines the overall price differentials for all of the item strata to determine a CPI according to the CPI type obtained at block 1505. In an example implementation, at block 1535 the price differential combiner 920 included in the example CPI processor 140 combines the item strata price differentials determined at block 1525 based on a corresponding set of overall relative expenditure weights determined for each respective item stratum for the time periods to be measured by the CPI. For example, the price differential combiner 920 may use Equation 8 as described above to combine the relative expenditure weights obtained at block 1515 for each group of common items included in a particular stratum to determine an overall relative expenditure weight for the particular item stratum. Then, the price differential combiner 920 may use Equation 9 as described above to incorporate each item stratum's overall price differential into the CPI under determination as a function of the item stratum's overall relative expenditure during the time periods being measured.

After the price differentials are combined at block 1535 to determine the CPI, control proceeds to block 1540 at which the example CPI processor 140 outputs the determined CPI. For example, at block 1540 the example CPI processor 140 may provide the determined CPI to the example user interface 145 for presentation to a user. Additionally or alternative, the example CPI processor 140 may store the determined CPI for subsequent analysis. After the CPI is output at block 1540, execution of the example machine readable instructions 1030 ends.

Figure 16:
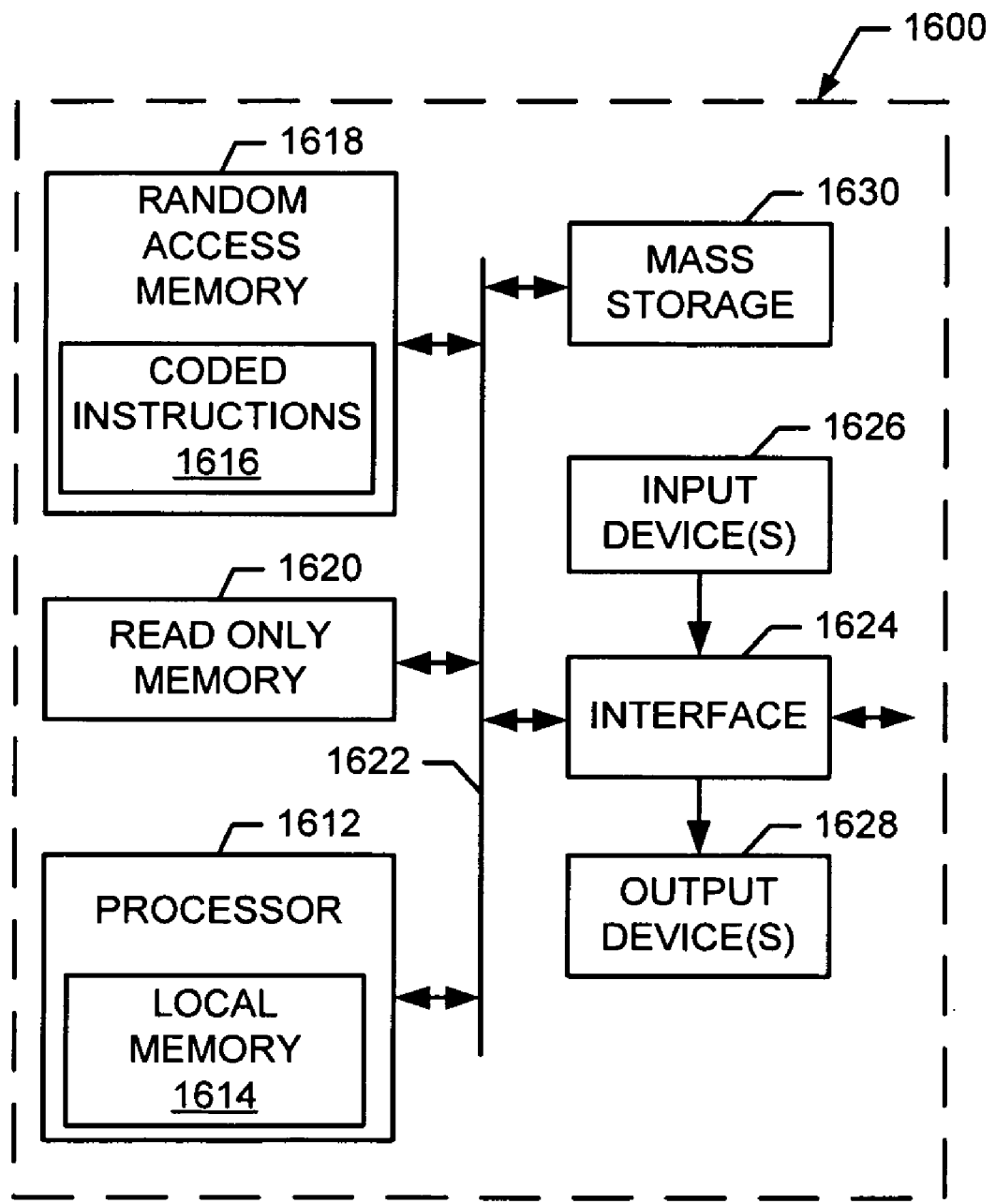
FIG. 16 is a block diagram of an example computer that may execute the example machine readable instructions of FIGS. 10-13, 14A-14B and/or 15 to implement the example system of FIG. 1 and/or any components thereof.

FIG. 16 is a block diagram of an example computer 1600 capable of implementing the apparatus and methods disclosed herein. The computer 1600 can be, for example, a server, a personal computer, a personal digital assistant (PDA), an Internet appliance, a DVD player, a CD player, a digital video recorder, a personal video recorder, a set top box, or any other type of computing device.

The system 1600 of the instant example includes a processor 1612 such as a general purpose programmable processor. The processor 1612 includes a local memory 1614, and executes coded instructions 1616 present in the local memory 1614 and/or in another memory device. The processor 1612 may execute, among other things, the machine readable instructions represented in FIGS. 10-15. The processor 1612 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1612 is in communication with a main memory including a volatile memory 1618 and a non-volatile memory 1620 via a bus 1622. The volatile memory 1618 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1620 may be implemented by flash memory and/or any other desired type of memory device. Access to the main memory 1618, 1620 is typically controlled by a memory controller (not shown).

The computer 1600 also includes an interface circuit 1624. The interface circuit 1624 may be implemented by any type of interface standard, such as an Ethernet interface, a universal serial bus (USB), and/or a third generation input/output (3GIO) interface.

One or more input devices 1626 are connected to the interface circuit 1624. The input device(s) 1626 permit a user to enter data and commands into the processor 1612. The input device(s) can be implemented by, for example, a keyboard, a mouse, a touchscreen, a track-pad, a trackball, an isopoint and/or a voice recognition system.

One or more output devices 1628 are also connected to the interface circuit 1624. The output devices 1628 can be implemented, for example, by display devices (e.g., a liquid crystal display, a cathode ray tube display (CRT)), by a printer and/or by speakers. The interface circuit 1624, thus, typically includes a graphics driver card.

The interface circuit 1624 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1600 also includes one or more mass storage devices 1630 for storing software and data. Examples of such mass storage devices 1630 include floppy disk drives, hard drive disks, compact disk drives and digital versatile disk (DVD) drives. The mass storage device 1630 may implement the market research database 105 and/or the product reference dictionary database 125. Alternatively, the volatile memory 1618 may implement the market research database 105 and/or the product reference dictionary database 125.

As an alternative to implementing the methods and/or apparatus described herein in a system such as the device of FIG. 16, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to determine a consumer price index, the method comprising:
    obtaining, at a processor, panelist market research data determined by monitoring items purchased by a plurality of statistically-selected panelists;
    obtaining, at the processor, retail site market research data for items sold by a plurality of retail sites;
    determining weighted equivalent unit pricing information by combining, using the processor, the panelist market research data and the retail site market research data to determine the weighted equivalent unit pricing information for each group of common items in an item stratum of the consumer price index having substantially similar attributes except for an amount per unit; and
    determining the consumer price index using the weighted equivalent unit pricing information.

2. A method as defined in claim 1 wherein the panelist market research data comprises panelist demographic data, purchase pricing information, purchased brand identification information, purchased item type information, purchase location information, and purchased unit quantity information for the items purchased by the plurality of statistically-selected panelists during an interval of time measured by the consumer price index.

3. A method as defined in claim 1 wherein the retail site market research data comprises regular pricing information, promotional pricing information, sold item brand identification information, sold item type information, sale location information and sold unit quantity information for the products sold by the plurality of retail sites during an interval of time measured by the consumer price index.

4. A method as defined in claim 1 wherein combining the panelist market research data and the retail site market research data to determine the weighted equivalent unit pricing information comprises:
    normalizing a price associated with each item in the group of common items by a respective amount per unit associated with the item;
    combining the normalized price for each item to determine an equivalent unit price to associate with an equivalent item representative of the group of common items; and
    determining a common group relative expenditure weight to associate with the equivalent unit price based on relative expenditure weights associated with each item in the group of common items.

5. A method as defined in claim 4 further comprising determining the price associated with each item in the group of common items by processing the retail site market research data to determine pricing information for each item sold by the plurality of retail sites and included in at least one item stratum of the consumer price index.

6. A method as defined in claim 5 wherein the pricing information determined by processing the retail site market research data comprises a regular price and a promoted price for at least some of the items sold by the plurality of retail sites and included in at least one item stratum of the consumer price index.

7. A method as defined in claim 6 wherein combining the normalized price for each item to determine the equivalent unit price to associate with the equivalent item representative of the group of common items comprises:
    combining normalized regular prices associated with each item in the group of common items to determine an equivalent unit regular price to associate with the equivalent item representative of the group of common items; and combining normalized promoted prices associated with each item in the group of common items to determine an equivalent unit promoted price to associate with the equivalent item representative of the group of common items.

8. A method as defined in claim 4 further comprising determining the relative expenditure weight associated with each item in the group of common items by processing the panelist market research data to determine relative expenditure weights for each item purchased by the plurality of statistically-selected panelists and included in at least one item stratum of the consumer price index.

9. A method as defined in claim 4 further comprising determining a relative equivalent unit expenditure weight for the representative equivalent item by accumulating the relative expenditure weights associated with the items included in the group of common items.

10. A method as defined in claim 1 wherein determining the consumer price index comprises:
    determining first equivalent unit pricing information corresponding to a first interval of time for each group of common items in each item stratum of the consumer price index;
    determining second equivalent unit pricing information corresponding to a second interval of time for each group of common items in each item stratum of the consumer price index;
    combining ratios of respective first and second equivalent unit pricing information for each group of common items in each item stratum to determine a price differential associated with each item stratum; and
    combining a plurality of determined price differentials associated with a respective plurality of item strata to determine the consumer price index.

11. A method as defined in claim 1 further comprising defining a plurality of item strata of the consumer index, wherein each item stratum is defined by specifying a unique set of attributes characteristic of items included in the particular item stratum.

12. A method as defined in claim 11 wherein the unique set of attributes are specified from a product reference dictionary listing attributes associated with all items represented by the panelist market research data and the retail site market research data.

13. A method as defined in claim 1 wherein the amount per unit comprises at least one of a quantity per unit or a unit size.

14. A method as defined in claim 1 wherein a group of common items has substantially similar attributes when items included in the common group have common brand identification information and common item type information.

15. A machine readable storage medium comprising machine readable instructions which, when executed, cause a machine to at least:
    obtain panelist market research data determined by monitoring items purchased by a plurality of statistically-selected panelists;
    obtain retail site market research data for items sold by a plurality of retail sites;
    determine weighted equivalent unit pricing information by combining the panelist market research data and the retail site market research data to determine the weighted equivalent unit pricing information for each group of common items in an item stratum of a consumer price index having substantially similar attributes except for an amount per unit; and
    determine the consumer price index using the weighted equivalent unit pricing information.

16. A storage medium as defined in claim 13 wherein the machine readable instructions, when executed, further cause the machine to combine the panelist market research data and the retail site market research data to determine weighted equivalent unit pricing information by:
    normalizing a price associated with each item in the group of common items by a respective unit amount associated with the item;
    combining the normalized prices for each item to determine an equivalent unit price to associate with an equivalent item representative of the group of common items; and
    determining an equivalent unit relative expenditure weight to associate with the equivalent unit price based on relative expenditure weights associated with each item in the group of common items.

17. A storage medium as defined in claim 16 wherein the machine readable instructions, when executed, further cause the machine to determine the price associated with each item in the group of common items by processing the retail site market research data to determine pricing information for each item sold by the plurality of retail sites and included in at least one item stratum of the consumer price index.

18. A storage medium as defined in claim 16 wherein the machine readable instructions, when executed, further cause the machine to determine the relative expenditure weight associated with each item in the group of common items by processing the panelist market research data to determine relative expenditure weights for each item purchased by the plurality of statistically-selected panelists and included in at least one item stratum of the consumer price index.

19. A storage medium as defined in claim 13 wherein the machine readable instructions, when executed, further cause the machine to define a plurality of item strata of the consumer index, wherein each item stratum is defined by specifying a unique set of attributes characteristic of items included in the particular item stratum.

20. A system to determine a consumer price index, the system comprising:
    a first storage unit to store panelist market research data determined by automatically monitoring items purchased by a plurality of statistically-selected panelists;
    a second storage unit to store retail site market research data comprising point-of-sale data for items sold by a plurality of retail sites;
    an equivalent unit pricing processor to determine weighted equivalent unit pricing information by electronically combining the panelist market research data electronically retrieved from the first storage unit and the retail site market research data electronically retrieved from the second storage unit to determine the weighted equivalent unit pricing information for each group of common items in an item stratum of the consumer price index having substantially similar attributes except for an amount per unit; and
    a consumer price index processor to determine the consumer price index using the weighted equivalent unit pricing information.

21. A system as defined in claim 20 further comprising a data consolidator to determine relative expenditure weights for each item purchased by the plurality of statistically-selected panelists and included in at least one item stratum of the consumer price index based on the panelist market research data, wherein the determined relative expenditure weights are used by the equivalent unit pricing processor to determine the weighted equivalent unit pricing information.

22. A system as defined in claim 21 wherein the data consolidator is further to determine the relative expenditure weights for a specific panelist demographic based on panelist demographic information included in the panelist market research data.

23. A system as defined in claim 20 wherein the equivalent unit pricing processor is further to determine the weighted equivalent unit pricing information for a specific panelist demographic based on panelist demographic information included in the panelist market research data.

24. A system as defined in claim 20 wherein the equivalent unit pricing processor is configured to determine weighted equivalent unit regular pricing information and weighted equivalent unit promoted pricing information for each group of common items based on regular and promoted pricing information included in the retail site market research data.

25. A system as defined in claim 20 further comprising a consumer price index processor to:
 combine the weighted equivalent unit pricing information determined for each group of common items in the item stratum to determine a price differential associated with the item stratum; and
 combine a plurality of determined price differentials associated with a respective plurality of item strata to determine the consumer price index.

26. A system as defined in claim 20 wherein the first storage unit and the second storage unit are implemented by a common storage unit.

27. A system as defined in claim 20 further comprising a central data facility to obtain the panelist market research data and the retail site market research data.

28. A system as defined in claim 20 further comprising a market research data decoder to decode the panelist market research data to obtain panelist demographic data, purchase pricing information, purchased brand identification information, purchased item type information, purchase location information, and purchased unit quantity information for the items purchased by the plurality of statistically-selected panelists during an interval of time measured by the consumer price index, and to decode the retail site market research data to obtain regular pricing information, promotional pricing information, sold item brand identification information, sold item type information, sale location information and sold unit quantity information for the products sold by the plurality of retail sites during the interval of time measured by the consumer price index.

29. A system as defined in claim 25 wherein the consumer price index processor is further configured to determine the consumer price index for a specific panelist demographic based on panelist demographic information included in the panelist market research data.

* * * * *

UNITED STATES PATENT AND TRADEMARK OFFICE
CERTIFICATE OF CORRECTION

PATENT NO. : 8,275,682 B2
APPLICATION NO. : 12/341854
DATED : September 25, 2012
INVENTOR(S) : Keith Johnson It is certified that error appears in the above-identified patent and that said Letters Patent is hereby corrected as shown below:

In the Claims

Column 36, line 1 (claim 16), delete "claim 13" and insert --claim 15--.
Column 37, line 12 (claim 24), delete "is configured to determine" and insert --is to determine--.

Signed and Sealed this
Twenty-fourth Day of June, 2014

Michelle K. Lee
*Deputy Director of the United States Patent and Trademark Office*